US008436842B2

(12) United States Patent
Takatori et al.

(10) Patent No.: US 8,436,842 B2
(45) **Date of Patent: *May 7, 2013**

(54) DISPLAY APPARATUS

(75) Inventors: Kenichi Takatori, Tokyo (JP); Hideki Asada, Tokyo (JP); Hiroshi Haga, Tokyo (JP)

(73) Assignee: NEC Corporation (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/947,064

(22) Filed: Nov. 16, 2010

(65) Prior Publication Data

US 2011/0063264 A1 Mar. 17, 2011

Related U.S. Application Data

(63) Continuation of application No. 11/682,192, filed on Mar. 5, 2007, now Pat. No. 7,859,525.

(30) Foreign Application Priority Data

Mar. 6, 2006 (JP) ................................ 2006-059663
Feb. 23, 2007 (JP) ................................ 2007-044110

(51) Int. Cl.
*G06F 3/038* (2006.01)

(52) U.S. Cl.
USPC ............................ 345/206; 345/204; 345/690

(58) Field of Classification Search ............ 345/76–102, 345/204–206
See application file for complete search history.

(56) References Cited

U.S. PATENT DOCUMENTS

| | | | | |
|---|---|---|---|---|
| 6,727,875 | B1 * | 4/2004 | Mikami et al. | 345/92 |
| 7,253,865 | B2 | 8/2007 | Battersby | |
| 7,400,320 | B2 | 7/2008 | Nakajima et al. | |
| 2005/0041002 | A1 * | 2/2005 | Takahara et al. | 345/76 |

FOREIGN PATENT DOCUMENTS

| | | | |
|---|---|---|---|
| CN | 1338719 | A | 3/2002 |
| JP | 2002-32051 | A | 1/2002 |
| JP | 2003-271100 | A | 9/2003 |
| JP | 2004-046054 | A | 2/2004 |
| JP | 2005-529368 | A | 9/2005 |
| JP | 2006-301581 | A | 11/2006 |
| JP | 2008-139872 | A | 6/2008 |
| WO | 01/29814 | A1 | 4/2001 |

OTHER PUBLICATIONS

Applicant's Admitted Prior Art (specification pp. 1-9, Figs. 16-20).*
Hiroshi Haga et al. "24.4: A 510-Kb SOG-DRAM for Frame-Memory-Integrated Displays" System on Glass Research Laboratories, SID Digest, 2005, pp. 1106-1109.
Office Action, issued Apr. 3, 2012 by the Japanese Patent Office in counterpart Japanese Application No. 2007-044110.

* cited by examiner

*Primary Examiner* — Duc Dinh
(74) *Attorney, Agent, or Firm* — Altis Law Group, Inc.

(57) ABSTRACT

Provided is a display apparatus capable of reducing the scale of a drive circuit and decreasing the frame. A display area in which pixels are provided in matrix, a scanning line drive circuit for driving scanning lines, and a signal line drive circuit for driving signal lines are provided on a support substrate. The pixel within the display area is constituted with a plurality of dots. Each dot corresponds to a color filter of a certain color. The dot is in a laterally long shape, i.e. in a shape extending in a direction along the scanning lines. In other words, each dot is in a shape extending in parallel with the longitudinal direction of the signal line drive circuit. The color filters are of lateral stripe type, for example.

16 Claims, 30 Drawing Sheets

PRIOR ART

3501 : SCANNING CIRCUIT/DATA REGISTER
3502 : DAC
3503 : LEVEL SHIFTER
3504 : SCANNING CIRCUIT
3505 : ANALOG SWITCH

PRIOR ART

105 : LATCH CIRCUIT
106 : DAC CIRCUIT
107 : SELECTOR CIRCUIT
108 : LEVEL SHIFTER (D-BIT)
110 : DISPLAY PART
112 : OUTPUT BUFFER (D-BIT)
3506 : SCANNING CIRCUIT
3507 : DATA REGISTER

PRIOR ART

PRIOR ART

PRIOR ART

DISPLAY APPARATUS

CROSS-REFERENCE TO RELATED APPLICATIONS

This application is a continuation of U.S. application Ser. No. 11/682,192 filed Mar. 5, 2007, which claims priority to JP 2006-059663 filed Mar. 6, 2006, and JP 2007-044110 filed Feb. 23, 2007. The entire disclosures of the prior applications are hereby incorporated by reference.

BACKGROUND OF THE INVENTION

1. Field of the Invention

The present invention relates to a display apparatus that is constituted with pixels arranged in matrix on a substrate and, in particular, to a display apparatus with built-in electronic circuits.

2. Description of the Related Art

Color display apparatuses such as color liquid crystal display apparatuses are used widely. Among the color display apparatuses, especially those of color-filter type using micro-color filters are broadly used mainly for the liquid crystal display apparatuses. An example of the conventional color display apparatus of the color-filter type will be described by referring to the accompanying drawings.

FIG. 16 is a plan view for showing each dot (display unit of a certain color) and layout of color filters within a display area according to the example of the conventional display apparatus. Explanations thereof will be provided hereinafter by referring to this drawing.

In this display apparatus, a color filter of a certain color is provided by corresponding to a single dot. Three colors of R (RED), G (GREEN), and B (BLUE) are used as the colors of the filters. In the lateral direction of the drawing, i.e. in the direction along scanning lines G1, G2, G3, - - - , the color filters of each color are arranged in order of R, G, B, R, G, B, - - - in an orderly manner. In the longitudinal direction, i.e. in the direction along signal lines D1, D2, D3, - - - , color filters of the same color are arranged. Such layout of the color filters is generally referred to as a stripe layout. The stripes are lined in the longitudinal direction in this example, so that this type is referred to as a longitudinal stripe type. Through the three dots lined continuously in the lateral direction by corresponding to the color filters of three colors, it is possible to display all the colors that can be obtained by combining the three fundamental colors. The minimum display unit for displaying all the colors, i.e. the color filters of R, G, B lined in the direction along the scanning line for three dots, is refereed to as one pixel.

Meanwhile, in accordance with the recent technical developments, such display apparatus has been put into practical use, in which various circuits such as a drive circuit and the like, which are conventionally provided outside by LSI and the like formed by a silicon technique, are built-in on a support substrate. An example of such the display apparatus with built-in circuits is a display apparatus formed by a high-temperature polysilicon TFT technique by a high-temperature process using an expensive quartz substrate. Furthermore, a display apparatus having circuits built-in on a glass substrate or the like is put into practical use by a low-temperature polysilicon technique in which a precursor film is formed by a low-temperature process and it is annealed by laser or the like for making it to polycrystalline.

As a specific example, there is an active-matrix type display apparatus disclosed in Japanese Unexamined Patent Publication 2004-046054 (Patent Literature 1). FIG. 17 is a block diagram for showing a display system that comprises a conventional drive circuit integrated type liquid crystal display apparatus shown in FIG. 37 of Patent Literature 1. Explanations thereof will be provided hereinafter by referring to FIG. 17.

In the conventional drive circuit integrated type liquid crystal display apparatus, an active matrix display region 110 where pixels wired in matrix in M rows and N columns are arranged, a scanning circuit for the row direction (scanning line drive circuit or gate line drive circuit) 109, a scanning circuit for the column direction (data line drive circuit) 3504, an analog switch 3505, a level shifter 3503, etc. are integrally formed on a display device substrate 101 by polysilicon TFT.

A controller 113, a memory 111, a digital-analog converter circuit (DAC circuit) 3502, a scanning circuit/data register 3501, and the like are in an integrated circuit chip (IC chip) that is formed on a single-crystal silicon wafer, which is mounted outside the display device substrate 101. An interface circuit 114 is formed on a system-side circuit substrate 103.

Further, among the conventional drive circuit integrated type liquid crystal display apparatus formed by the polysilicon TFT, there are such types in which more complicated circuits such as the DAC circuit and the like are formed integrally. FIG. 18 is a block diagram for showing a display system of a conventional DAC circuit built-in type liquid crystal display apparatus that is shown in FIG. 38 of Patent Literature 1. Explanations thereof will be provided hereinafter by referring to FIG. 18.

Like the drive circuit integrated type liquid crystal display apparatus shown in FIG. 37 of Patent Literature 1 having no built-in DAC circuit, the conventional DAC circuit built-in type liquid crystal display apparatus comprises circuits such as a data register 3507, a latch circuit 105, a DAC circuit 106, a selector circuit 107, a level shifter/timing buffer 108, etc. formed integrally on a display device substrate 101, in addition to the active matrix display region 110 where pixels wired in matrix in M rows and N columns are arranged, the scanning circuit 109 for the row direction, and the scanning circuit 3506 for the column direction.

In this structure, the control IC mounted outside the display device substrate 101 does not include a DAC circuit that uses high voltage. Thus, it can be constituted solely with circuits/devices of low voltage, e.g. the memory 111, the output buffer circuit (D-bit) 112, and the controller 113. As a result, the IC can be fabricated without employing the process for the high-voltage device that is required for generating voltage signals for writing to the liquid crystal. Therefore, the price can be suppressed lower compared to that of the above-described IC on which the DAC is embedded.

Furthermore, the inventors of the present invention has advanced integration of various circuits on a support substrate and invented a method for integrating a memory on the support substrate (Unpublished). Moreover, as a technique for integrating memories, the inventors of the present invention have presented a frame memory on a glass substrate for the first time in the world (SID 05 DIGEST, pp. 1106-1109: Non-Patent Literature 1). FIG. 19 is a block diagram for showing a conventional frame memory on a glass substrate that is shown in FIG. 1 of Non-Patent Literature 1. Explanations thereof will be provided hereinafter by referring to FIG. 19.

In this case, not only the frame memory and the circuit related to the control thereof but also a compression circuit for compressing signals to reduce the size of the frame memory and a decompression circuit for decompressing the compressed signals are provided. The core part of the frame memory is constituted with a memory cell array 121 with a sense amplifier, a row decoder 122, and a column decoder 123. It is possible with the row decoder 122 and the column decoder 123 to access to a specific memory cell within the frame memory. Further, the signal outputted from the memory cell is outputted via the sense amplifier. Such frame memory circuit is formed on a glass substrate 120. FIG. 20 shows the circuits for 1-bit line of the memory cell array 121 with the sense amplifier.

FIG. 20 is a circuit diagram for showing 1-bit line of the conventional memory cell array with a sense amplifier that is shown in FIG. 3 of Non-Patent Literature 1. Explanations thereof will be provided hereinafter by referring to FIG. 20.

At the time of writing, data on a data line 163 is written to a bit line pair that is selected based on a signal from the column decoder. The data on the bit line pair is written to each memory cell 161 of the selected word lines (indicated by W[239], W [118], W[1], W[0] in the drawing). Meanwhile, at the time of readout, the data on the selected word lines is read out to the bit line pair, which is amplified by the sense amplifier 160 and outputted to the output register side.

There are some issues to be overcome in the display apparatuses disclosed in Patent Literature 1 and Non-Patent Literature 1.

The first issue is that the circuits on the support substrate tend to be large-scaled in terms of the layout compared to that of the circuits formed by LSI outside the support substrate. This happens because, with the design rule, the size of the circuit on the support substrate is larger than the circuit of the LSI by the silicon technique. It is because the size of the support substrate used in the display apparatus is generally larger than that of the silicon substrate used in the LSI technique, so that the circuits on the support substrate are more likely to be affected by expansion/contraction of the support substrate itself, or the positioning accuracy by step exposure using a stepper becomes deteriorated, etc.

The second issue is that it is highly difficult to design the layout of the circuits on the support substrate. This is due to the fact that it is difficult to decrease the area occupied especially by the circuits on the signal drive circuit side, in addition to the fact that it requires a contrivance to save the occupied area because the design rule mentioned above is large. This is because the circuits on the signal drive circuit side include not only the scanning circuit but also the analog switch, the level shifter, DAC and the like as described above, so that the circuit structure becomes complicated. Further, as shown in FIG. 16, it is also a reason that the pitch between the signal lines on the signal drive circuit side is narrower than the pitch between the scanning lines on the scanning drive circuit side in the conventional display apparatus. When the pitch in the area for arranging the circuits is narrow, it becomes difficult to draw around the wirings for the input signals necessary for each circuit and the input/output signals between each circuit. In addition, the proportion occupied by the wirings for the signals is increased with respect to the layout area, so that the layout area for the circuits is decreased relatively. As a result, the difficulty of the circuit layout is increased.

The third issue is that the frame (the distance between the end of the display area and the end face of the support substrate) on the signal drive circuit side becomes increased. This is caused because the circuit structure on the signal drive circuit side is complicated and the pitch of the layout is narrow, so that the area occupied by the wirings for the signals is increased. Thus, it needs to increase the length of the circuit area for arranging the necessary circuits.

The fourth issue is that it cannot achieve a highly fine display apparatus. The reason for this is that, as shown in FIG. 25, it is not possible with the longitudinal stripe type to design the layout of the circuits within the circuit pitch determined by the design rule (not possible to arrange the circuits within the circuit pitch), i.e. referring to FIG. 25, it is not possible to design the layout with the longitudinal stripe type by the pixel pitch (141 μm) that correspond to 180 ppi. This issue is different from the aforementioned issues concerning expansion of the frame and an increase in the difficulty of layout. Rather, the issue is that it is not possible to design the layout itself, so the apparatus itself cannot be formed. In order to achieve the layout with this condition, the design rule has to be changed. For changing the design rule, it is necessary to start from a new process development, which is very difficult.

The fifth issue is that the time required for the development is increased. It is because the time required for designing the layout and the like is increased due to the above-described four issues, thereby increasing LT (Lead Time).

The sixth issue is that the cost for the display apparatus is increased. As described above, this is because the time required for the development is increased, thereby mounting up the development cost. Further, another reason for this is that it requires a large number of metal layers since providing the layout is highly difficult. Therefore, the number of processes is drastically increased, thereby increasing TAT (Turn Around Time).

The seventh issue is that an external shape of the display apparatus having a non-rectangular display area becomes largely changed. It is because the frame on the signal line drive circuit side becomes expanded, as mentioned in the description regarding the third issue. For the display apparatus having a non-rectangular display area, it is more effective in terms of the design, if the external shape of the display apparatus is in a shape similar to that of the display area. However, it is difficult with the conventional display apparatus to make the external shape in a similar shape of the display area.

SUMMARY OF THE INVENTION

An object of the present invention therefore is to provide a display apparatus with built-in circuits, in which the circuit area is decreased. It is another object of the present invention to provide a display apparatus with built-in circuits, in which the size/weight thereof is reduced by decreasing the frame including the circuit part. It is still another object of the present invention to provide a display apparatus with built-in circuits, in which the difficulty of providing layout is decreased. It is yet another object of the present invention to provide a display apparatus that is capable of achieving short TAT and low cost. Furthermore, a further object is to provide a display apparatus with short LT. A still further object of the present invention is to provide a highly fine display apparatus.

A yet further object of the present invention is to provide, in a practical manner, a zero-chip display which comprises a frame memory, a controller, a CPU interface, and the like within a display apparatus, and requires no IC chip related to display to be provided outside the display apparatus.

Another object of the present invention is to provide a display apparatus with a non-rectangular display area, which has an external shape similar to that of the display area.

A display apparatus according to the present invention comprises: a display part where pixels, each being constituted with a single or a plurality of dots, are arranged in matrix on a support substrate in a first direction and a second direction; a first circuit provided on outer side of the first direction of the display part on the support substrate; and a second circuit whose scale is lager than that of the first circuit, which is provided on outer side of the second direction of the display part on the support substrate. The dot is in a shape that is longer in the first direction than the second direction.

For example, the first direction is a lateral direction or a right-and-left direction and the second direction is a longitudinal direction or a top-and-bottom direction. Inversely, the first direction may be defined as the longitudinal direction or the top-and-bottom direction and the second direction as the lateral direction or the right-and-left direction. The first direction and the second direction may not necessarily be orthogonal to each other but may cross each other obliquely. Further, the first direction and the second direction may not necessarily extend in straight lines but may form gentle curves in accordance with the shape of the display part. On the outer side of the first direction of the display part, there are the left side and the right side if the first direction is the lateral direction, for example. In that case, the first circuit is provided at least on either the left side or the right side. This is also the same for the second circuit. When the shape of the dot is a rectangle, for example, and each of the sides is in parallel to the first direction or the second direction, the first direction of the dot corresponds to the long sides and the second direction to the short sides. The shape of the dot is not limited to the rectangle but may be any shapes such as a triangle, a polygon, and an oval. The shape of the dots, which is the feature of the present invention, may not necessarily be applied to all the dots in the display part but may be applied only to a part of the dots, as long as the effect of the present invention can be obtained. The scale of the circuit includes all of the elements that constitute the circuit, wirings, spaces and the like, and it reflects upon the occupied area.

Next, the features and the effects of the present invention will be described in a different form.

The features of the present invention will be described. The display apparatus of the present invention comprises a built-in circuit along with a display area (4) that is constituted with a plurality of dots arranged on a support substrate, in which each dot corresponding to color filters of certain colors is in a laterally long shape. The display apparatus of the present invention comprises a built-in circuit along with a display area (4) that is constituted with a plurality of dots arranged on a support substrate, in which each dot corresponding to light-emitting elements of certain colors is in a laterally long shape. The display apparatus of the present invention is an apparatus in which the display area (4) constituted with a plurality of dots arranged on the support substrate, the scanning line drive circuit (2), and other circuits are integrated, wherein at least one of the two-dimensional pitches of the dots is the short side of the scanning line drive circuit side. The display apparatus of the present invention is characterized in that a relation "$b+c>1/k$" is satisfied, where c is the proportion of the sum of the wiring part and the space part occupying the repeated pitch in the lateral direction of the circuit, b is the ratio of the lateral size of the circuit part (22) except the wiring part and the space part to the longitudinal size thereof, and k is the number of the plurality of colors. When the scale of the circuit arranged in the longitudinal direction is smaller than that of the circuit arranged in the lateral direction, a relation "$e+f>1/k$" is satisfied, where f is a proportion of the sum of the wiring part and the space part occupying the repeated pitch in the longitudinal direction of the circuit, e is the ratio of the longitudinal size of the circuit part (22) except the wiring part and the space part to the lateral size thereof.

The effects of the present invention will be described. As will be shown in the embodiments, the scale of the circuit provided in the right-and-left direction (lateral direction) of the display part and that of the circuit provided to the top-and-bottom direction (longitudinal direction) of the display part are different. That is, normally, the scale of the circuit provided in the top-and-bottom direction has a larger scale. By forming the dots that correspond to the color layout of the color filters or light-emitting elements into laterally long shapes and by supplying data of a plurality of colors to a single signal line, the pitch of the dots on the larger-scale circuit side can be increased. Meanwhile, the pitch of the dots on the smaller-scale circuit side is decreased. At the same time, the scale of the circuit becomes larger for the number of colors being arranged, since the colors are different by each signal line. In this case, assuming that the number of colors is k, and a ratio of the difference in the circuit scales is q (q is larger than 1), conventionally, the scale of the circuit on the signal line side is "$k \cdot q$" when the circuit on the scanning line side is 1, and the entire circuit scale is "$1+k \cdot q$". With the present invention, however, the scale of the circuit on the scanning line side is k, and that of the circuit on the signal line side is q, so that the entire circuit scale becomes "$k+q$". The condition with which the circuit scale of the present invention becomes smaller than that of the conventional structure is "$1+k \cdot q>k+q$", and "$k>1$" can be obtained by a simple calculation. That is, when there are a plurality of colors, the entire circuit scale can be decreased with the present invention. When the scanning line drive circuit is provided in the top-and-bottom direction of the display part, the effects of the present invention can be achieved as well by setting a large dot pitch for the pitch of the large-scaled circuit that is on the side with no scanning line drive circuit, i.e. the dot pitch in the top-and-bottom direction.

In the display apparatus according to the present invention, the small-scaled first circuit is provided to the outer side of the first direction of the display part, the large-scaled second circuit is provided to the outer side of the second direction of the display part, and the shape of the dot is set to be longer in the first direction and shorter in the second direction. With this; the area of the second circuit per wiring can be taken largely in the first direction, so that the length of the second circuit in the second direction can be shortened. As a result, it is possible to achieve the effect of narrowing the frame.

In other words, the first effect is that it is possible to provide a display apparatus in which the scale of the entire drive circuit can be drastically reduced by forming the shape of the dots that constitute the pixels into laterally long shapes. The reason for this is that, as will be described in the embodiments, the circuit scales are different between the circuit provided in the right-and-left direction (lateral direction) of the display part and the circuit provided in the top-and-bottom direction (longitudinal direction) of the display part. The present invention is capable of reducing the scale of the entire circuit that is large scaled. Thus, the scale of the entire drive circuit can be drastically reduced. The second effect is that the frame can be decreased by reducing the scale of the circuit that has a larger scale. The third effect is that the development time required for designing/layout can be cut since the scale of the entire drive circuit is reduced, thereby achieving the low cost. The fourth effect is that the present invention is capable of providing a highly reliable display apparatus, in which the provability of generating failures can be decreased because the circuit scale is reduced. The fifth effect is that the frame is reduced, so that the number of display apparatuses fabricated on a single support substrate can be increased (number of products produced therefrom is increased), thereby achieving the low cost. The sixth effect is that the frame is reduced, so that the size and weight of the display apparatus can be reduced. The seventh effect is that the layout of the circuit can be arranged without using an additional wiring layer because the layout of the circuit becomes simple. As a result, it is possible to achieve a drastic cut in the cost in terms of manufacture and design. The eighth effect is that the highly fine display apparatus can be achieved without changing the design rule, since the layout of the circuits can be designed within the range of the circuit pitch based on the design rule. The ninth effect is that the external shape of the display apparatus having a non-rectangular display area can be formed in a shape similar to that of the display area. The reason is that the circuit scale of the peripheral circuits can be formed small and arranged in a well-balanced manner.

DETAILED DESCRIPTION OF THE PREFERRED EMBODIMENTS

Figure 1A:
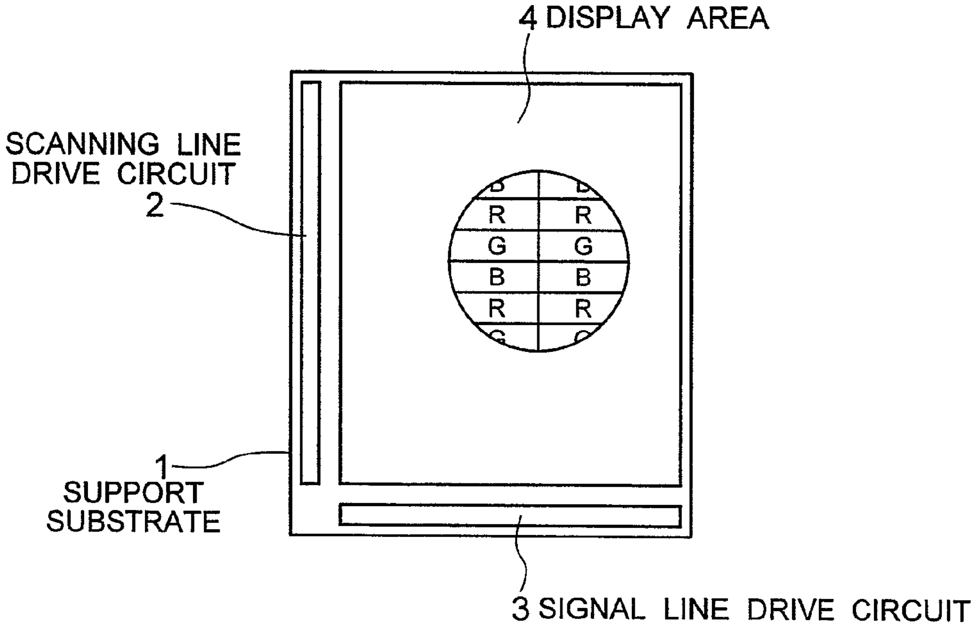
FIG. 1A is a plan view for showing a first embodiment of the display apparatus according to the present invention.

Now, preferred embodiments of the present invention will be described in detail by referring to the accompanying drawings. It is noted that "first direction, "second direction", "first circuit", "second circuit", and "display unit" within the scope of the appended claims correspond to "right-and-left direction or lateral direction" "top-and-bottom direction or longitudinal direction" "scanning line drive circuit", "signal line drive circuit", and "display area" of the embodiment, respectively. Further, the feature elements of a conventional technique having the same functions as those of the present invention are indicated with the same reference numerals with "'" mark added thereon. Furthermore, circles within the display area in the drawings are enlarged plan views showing a part (that is, a plurality of dots) of the display area.

Figure 1B:
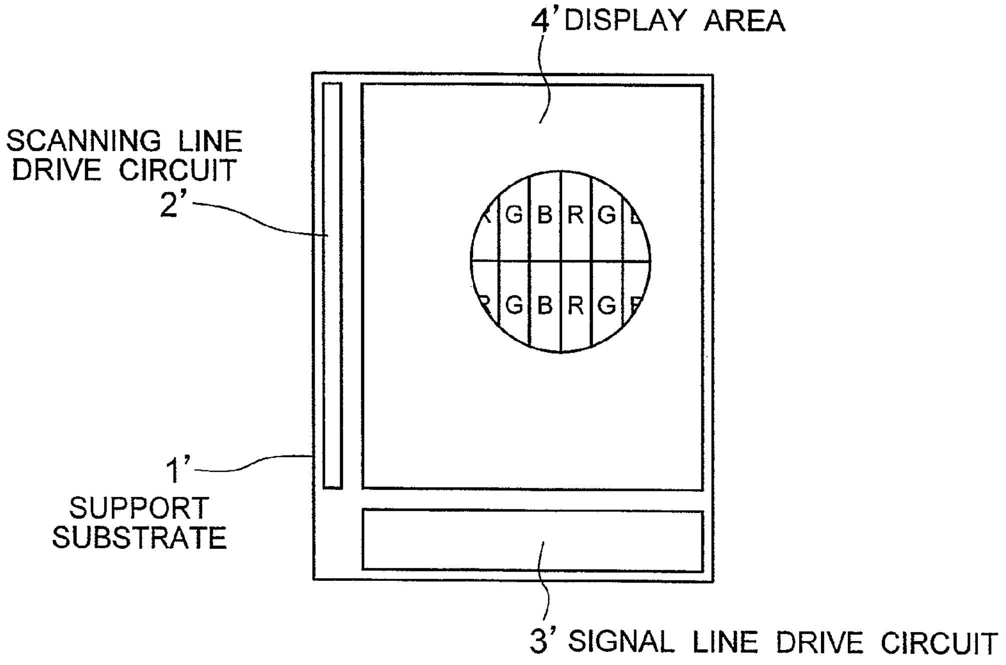
FIG. 1B is a plan view for showing Comparative Example 1.

FIG. 1A is a plan view for showing a first embodiment of a display apparatus according to the present invention. FIG. 1B is a plan view for showing a conventional display apparatus (referred to as "Comparative Example 1" hereinafter). There will be explanations provided hereinafter by referring to those drawings.

In the embodiment, a display area 4 in which pixels are provided in matrix, a scanning line drive circuit 2 for driving scanning lines, and a signal line drive circuit 3 for driving signal lines are provided on a support substrate 1. The pixel within the display area 4 is constituted with a plurality of dots. Each dot corresponds to a color filter of a certain color. The dot is in a laterally long shape, i.e. in a shape extending in a direction along the scanning lines. In other words, each dot is in a shape extending in parallel with the longitudinal direction of the signal line drive circuit 3. The color filters are of lateral stripe type, for example.

Meanwhile, in Comparative Example 1, a display area 4' in which pixels are provided in matrix, a scanning line drive circuit 2' for driving scanning lines, and a signal line drive circuit 3' for driving signal lines are provided on a support substrate 1' as in the case of the first embodiment. The pixel within the display area 4' is constituted with a plurality of dots. Each dot corresponds to a color filter of a certain color. It is extremely different from the first embodiment in respect that the color filters are of a longitudinal stripe type, i.e. in a shape extending in the direction along the signal lines. In other words, the color filter of each color is in a shape extending in parallel with the longitudinal direction of the scanning line drive circuit 2'.

Comparing the embodiment with Comparative Example 1, the circuit areas of the scanning line drive circuits 2 and 2' are almost equal. In the meantime, the circuit area for the signal line drive circuit 3 of the embodiment is about one third of the area for the signal line drive circuit 3' of Comparative Example 1. The reason for generating such difference will be described hereinafter in detail.

The signal necessary for the scanning line is normally in a simple binary pulse waveform at a constant interval, so that the scanning line drive circuits 2 and 2' can be constituted with a simple scanning circuit. Meanwhile, the signal necessary for the signal line is an analog signal that corresponds to the display data, or a digital signal constituted with a plurality of bits, which corresponds to the display data. Thus, unlike the scanning line signal, it is not in a simple pulse waveform at a constant interval. Therefore, the signal line drive circuits 3, 3' are in a structure that is more complicated than that of the scanning line drive circuits 2, 2'.

Figure 17:
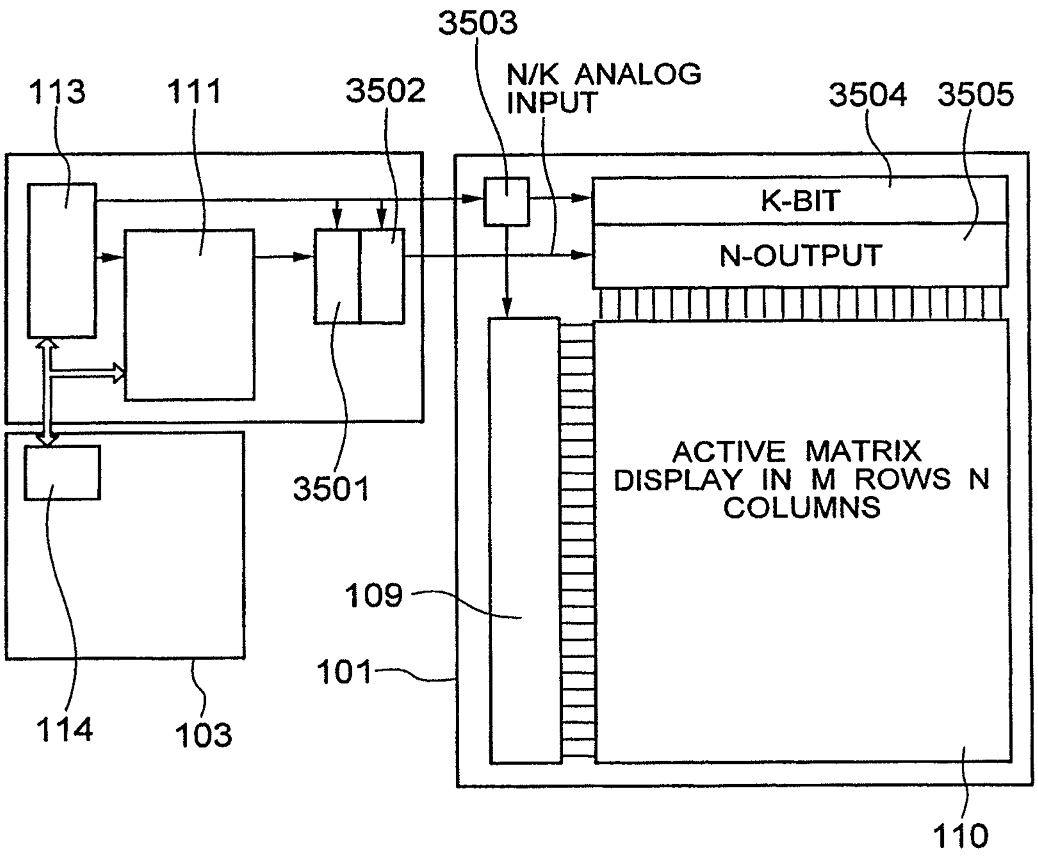
FIG. 17 is a block diagram for showing a display system that comprises a conventional liquid crystal display apparatus with an integrally-formed drive circuit.

Referring to the conventional case shown in FIG. 17, a scanning line drive circuit 109 is constituted only with a scanning circuit, and a signal line drive circuit is constituted with a scanning circuit 3504 and an analog switch 3505. As a result, the drive circuit block required for a single signal line is larger compared to the drive circuit block that is required for a single scanning line. The ratio of the scale of the drive circuit block per unit wiring is refereed to as "p" herein. That is, the scale of the drive circuit block per signal line is p times the scale of the drive circuit block per scanning line. The drive circuit block per signal line is larger than the drive circuit block per scanning line, so that p>1.

When the pixels in the display area 4' are in M rows in the longitudinal direction and N columns in the lateral direction in Comparative Example 1, the number of the scanning lines is M (lines) and the number of the signal lines is 3×N (lines) provided that the color filters are of three colors. In the meantime, when the pixels in the display area 4 are in M rows in the longitudinal direction and N columns in the lateral direction in the embodiment, the number of the scanning lines is 3×M (lines) provided that the color filters are of three colors, and the number of the signal lines is N (lines). Provided that the scale of the drive circuit block per scanning line is 1 in Comparative Example 1, the scale of the scanning line drive circuit 2' in Comparative Example 1 is M and the scale of the signal line drive circuit 3' is 3×N×p. Meanwhile, the scale of the scanning line drive circuit 2 according to the embodiment is 3×M and the scale of the signal line drive circuit 3 is N×p.

Here, numerical values are applied to estimate the entire scale of the circuits. First, it is assumed that the shape of the display area is vertically long as in FIG. 1A and FIG. 1B, and the ratio of the number of wirings M:N is 4:3. Further, the ratio p of the scales of the drive circuit blocks per unit wiring is 3. With this, the entire drive circuit of Comparative Example 1 is M+3×N×p=M+3×(3/4)M×3=(31/4)M. Meanwhile, the entire drive circuit of the embodiment is 3×M+N×p=3×M+(3/4)M×3=(21/4)M. Like this, the scale of the entire drive circuit of Comparative Example 1 is about 1.5 times larger than that of the embodiment.

Then, there is also investigated a case where the shape of the display area is laterally long and the ratio of the wiring numbers M:N is 3:4. When the ratio p of the scales of the drive circuit blocks per unit wiring is 3 like the aforementioned case, the entire drive circuit of Comparative Example 1 is M+3×N×p=M+3×(4/3)M×3=13M. Meanwhile, the entire drive circuit of the embodiment is 3×M+N×p=3×M+(4/3)M×3=7M. That is, the scale of the entire drive circuit of Comparative Example 1 is about twice as large as that of the embodiment. Like this, it is possible with the embodiment to reduce the scale of the entire drive circuit drastically.

The effect of reducing the scale of the drive circuit can be generated depending on the ratio p of the scales of the drive circuit blocks. To study the condition for generating the effect, there is solved a following inequality that is satisfied when the scale of the entire drive circuit according to the embodiment is smaller than that of Comparative Example 1.

$$M+3\times N\times p>3\times M+N\times p \quad (1)$$

A following condition is obtained by solving the inequality.

$$p>M/N \quad (2)$$

From the inequality (2) and the condition p>1 the ratio p satisfies, it can be seen that the effect of reducing the scale of the entire drive circuit according to the embodiment can be achieved at all times, when the display area is laterally long (M<N). Meanwhile, in the case where the display area is extremely longer in the longitudinal direction, the inequality (2) cannot be satisfied under a condition where M=4×N when p=3, for example. Thus, it is found that the effect of reducing the scale of the entire drive circuit according to the embodiment cannot be achieved.

In the meantime, for the scanning drive circuit, the scale of the drive circuit block per unit wiring is small. Thus, when designing the layout of the circuit, a space is often generated between the drive circuit blocks per unit wiring. Even if the circuits are arranged to reduce the space, the layout area is not reduced in size due to an increase and the like of the wiring area caused by drawing around of the wirings. As a result, a space is provided between the drive circuit block, and there is provided a margin for the layout within the drive circuit block on the side of the scanning drive circuit.

When the scale M of the scanning drive circuit of Comparative Example is 3×M as in the case of the embodiment, it is possible to design with almost no change in the entire layout area though arranging the circuits by eliminating the space and the margin described above. This is the reason why there is no change in the sizes of the scanning line drive circuits in FIG. 1A and FIG. 1B. That is, the embodiment is capable of providing layout that is closer to the most packed layout, so that it provides a high layout efficiency. In the case of the above-described display area that is extremely longer in the longitudinal direction, the space and margin described above are especially prominent. The use of the embodiment allows a reduction of idle areas in the layout area.

Meanwhile, as described above, the circuit scale of the signal line drive circuit is large, so that there is no space or margin in the layout. Thus, when designing the layout of large-scaled circuits, expansion of the frame is the only way to deal with it. The size of the circuit scale affects directly to the length of the circuit (in the longitudinal direction in FIG.

1A and FIG. 1B), so that there is a large influence upon the frame. The circuit scale of the signal line drive circuit of Comparative Example 1 and that of the embodiment are different by three times. As a result, the length of the signal line drive circuit of Example 1 is three times as long as that of the embodiment as shown in FIGS. 1A and 1B. Like this, it is possible with the embodiment to reduce the length of the signal line drive circuit and, as a result, reduce the frame. This effect is universal and it can be applied to the display apparatus with a display area that is extremely longer in the longitudinal direction.

As described above, the embodiment is capable of reducing the scale of the entire drive circuit. Further, it is capable of reducing the length of the signal line drive circuit. Since the scale of the entire drive circuit is reduced, the development time required for designing/layout can be cut, thereby achieving the low cost. Furthermore, it shortens LT that is the time from planning of the products to shipment. In addition, the provability of generating failures is decreased since the circuit scale is reduced, thereby improving the reliability. Further, since the frame is reduced, the number of display apparatuses fabricated on a single support substrate can be increased, thereby achieving the low cost. Furthermore, by reducing the frame, it is possible to achieve a light-weight display apparatus in which the weight of the display apparatus is reduced. At the same time, more small-sized, light-weight, and low-cost equipment can be achieved by using the display apparatus with a reduced frame. The laterally long dots are optimally designed as necessary, so that there is no fault display such as light leakage generated at each dot caused due to disclination of the liquid crystal.

Figure 2A:
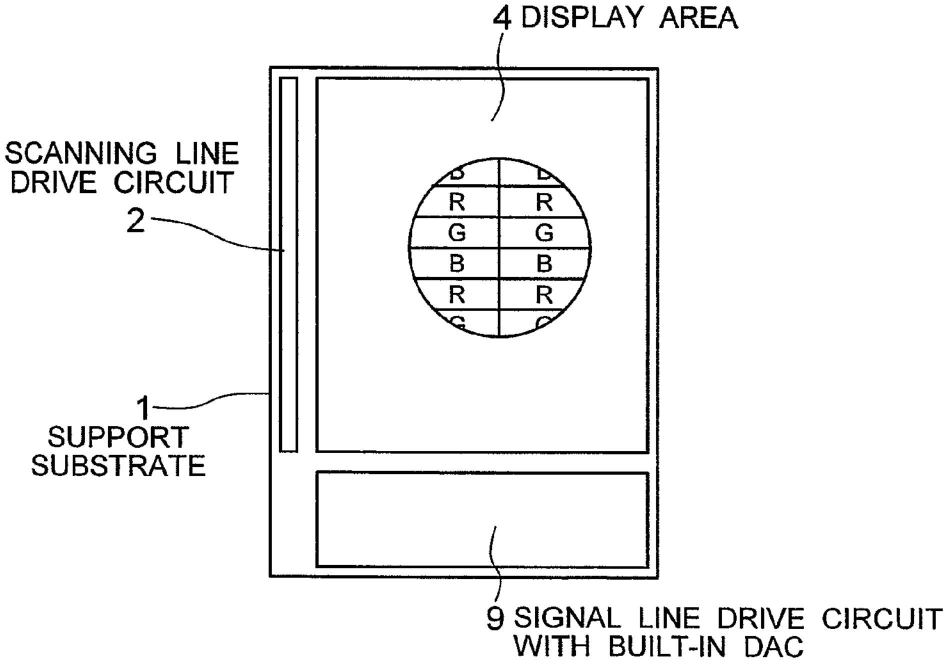
FIG. 2A is a plan view for showing a second embodiment of the display apparatus according to the present invention.
Figure 2B:
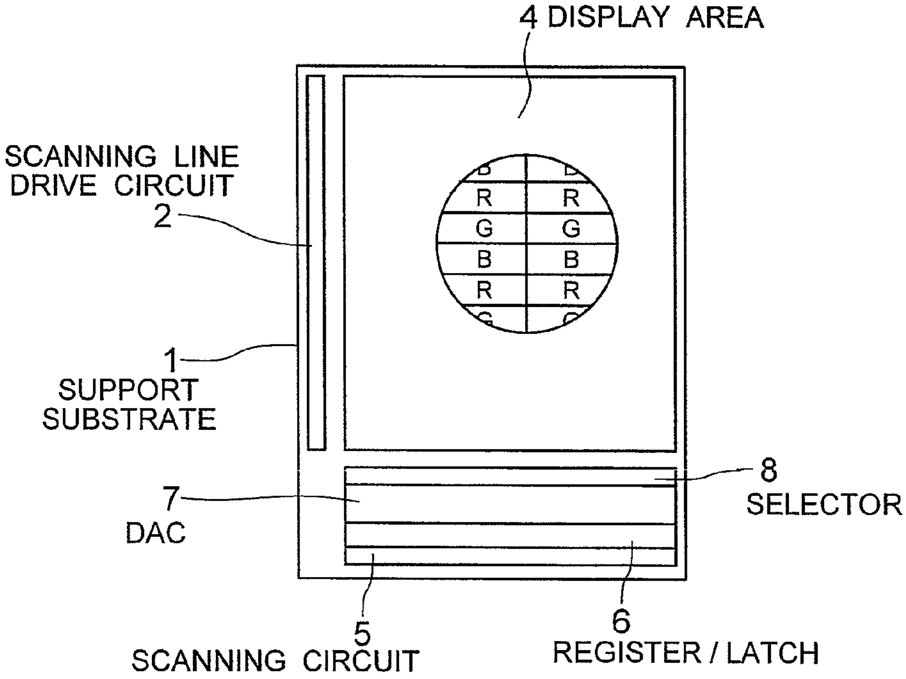
FIG. 2B is a plan view for showing an example of the signal line drive circuit shown in FIG. 2A.

FIG. 2A is a plan view for showing a second embodiment of the display apparatus according to the present invention. FIG. 2B is a plan view for showing an example of the signal line drive circuit in FIG. 2A. There will be explanations provided hereinafter by referring to those drawings.

Figure 18:
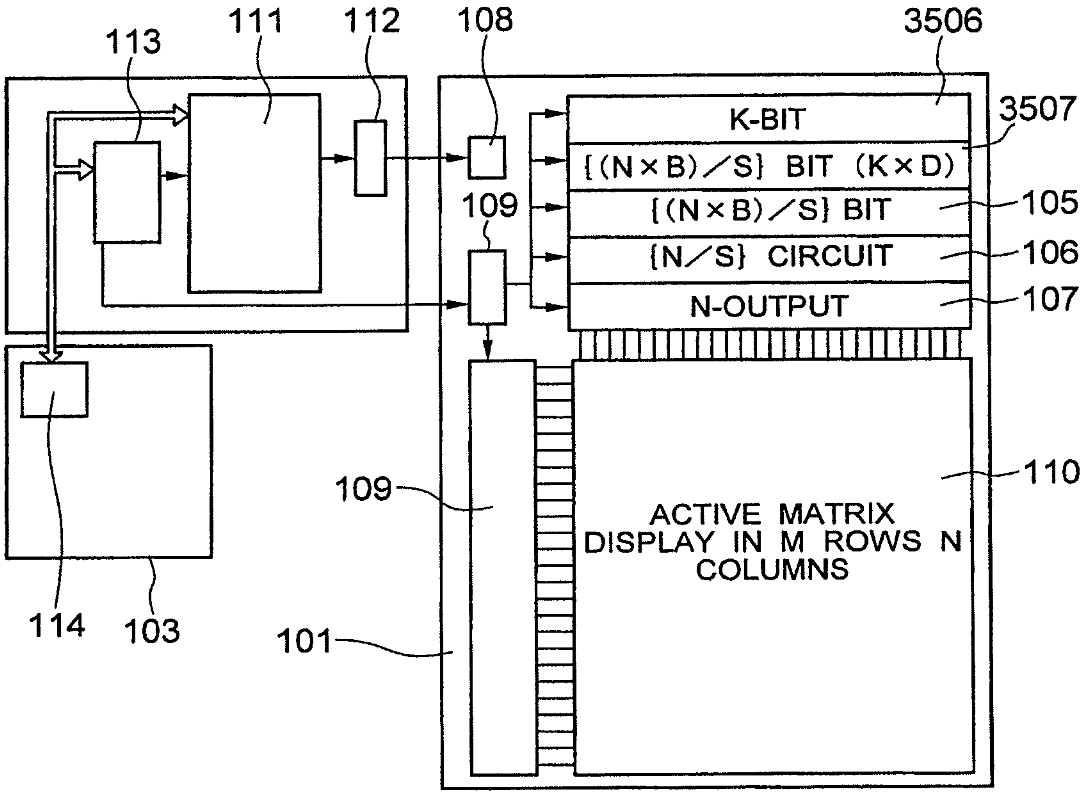
FIG. 18 is a block diagram for showing a display system that comprises a conventional liquid crystal display apparatus with a built-in DAC circuit.
Figure 19:
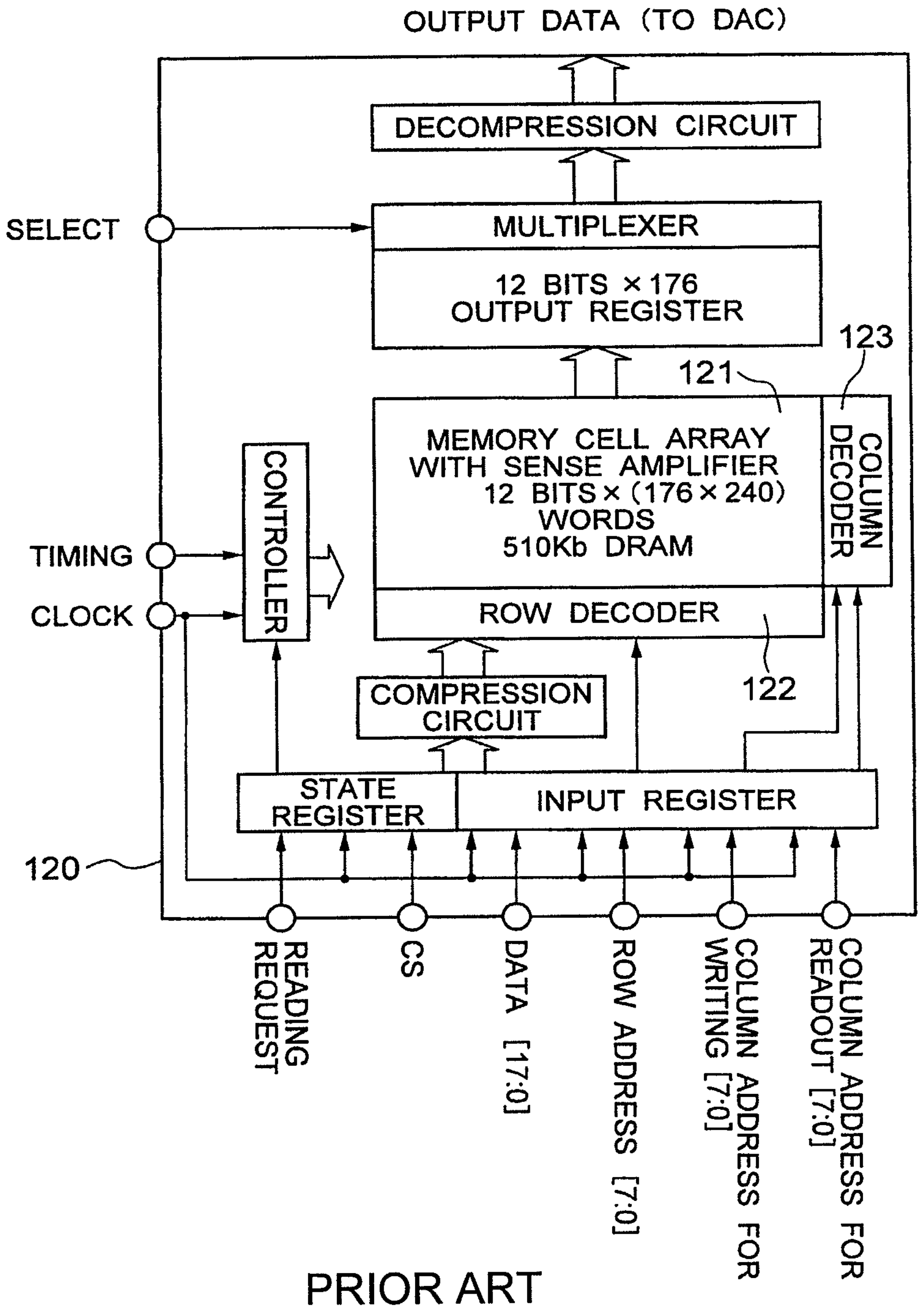
FIG. 19 is a block diagram for showing a conventional frame memory on a glass substrate.

In this embodiment, more complicated circuits such as a DAC circuit and the like shown in FIG. 38 of Patent Literature 1 (FIG. 18 of this application) are integrated, in addition to the structure of the first embodiment. That is, in this embodiment, a display area 4 in which pixels are provided in matrix, a scanning line drive circuit 2 for driving scanning lines, and a signal line drive circuit 9 with a built-in DAC are provided on a support substrate 1. The pixel within the display area 4 is constituted with a plurality of dots. Each dot corresponds to a color filter of a certain color. The dot is in a laterally long shape, i.e. in a shape extending in a direction along the scanning lines. In other words, each dot is in a shape extending in parallel with the longitudinal direction of the signal line drive circuit 9. The color filters are of lateral stripe type, for example.

More specifically, the signal line drive circuit 9 with a built-in DAC comprises a scanning circuit 5, a register/latch circuit 6, a DAC circuit 7, a selector 8, and the like being integrated thereon, as shown in FIG. 2B, for example. The circuit structure and the order of the layout in this signal line drive circuit 9 is not limited to the case shown in FIG. 2B, but various structures are possible.

This embodiment uses a signal line drive circuit that is more complicated than that of the first embodiment. Thus, the ratio p of the scale of the drive circuit block per scanning line to the scale of the drive circuit block per signal line is larger than that of the first embodiment. As a result, the effect achieved by the present invention is more prominent than that of the first embodiment.

Like the case of the first embodiment, numerical values are applied to show the effect of this embodiment. It is assumed here that the ratio p in this embodiment is 10. When the shape of the display area is vertically long and M:N=4:3, the scale of the entire drive circuit in the conventional technique is (47/2)M, and the scale of the entire drive circuit according to the second embodiment is (21/2)M. That is, the scale of the circuit according to the conventional technique is a little over 2.2 times the scale of the embodiment. Further, when the shape of the display area is laterally long and M:N=3:4, the scale of the entire drive circuit according to the conventional technique is 41M, and the scale of the entire drive circuit according to the embodiment is (49/3)M. That is, the scale of the circuit according to the conventional technique is a little over 2.5 times the scale of the embodiment. Like this, in the second embodiment whose circuit structure is more complicated and larger scaled than that of the first embodiment, the effect of reducing the scale of the entire drive circuit becomes more prominent.

Further, since the circuit is complicated, the length of the signal line drive circuit is extended more than that of the first embodiment. There is a difference in the lengths of the conventional technique and the embodiment by several times. It can be found from this that the use of this embodiment enables reduction in the length of the signal line drive circuit, and the effect of reducing the frame is significant.

Figure 3:
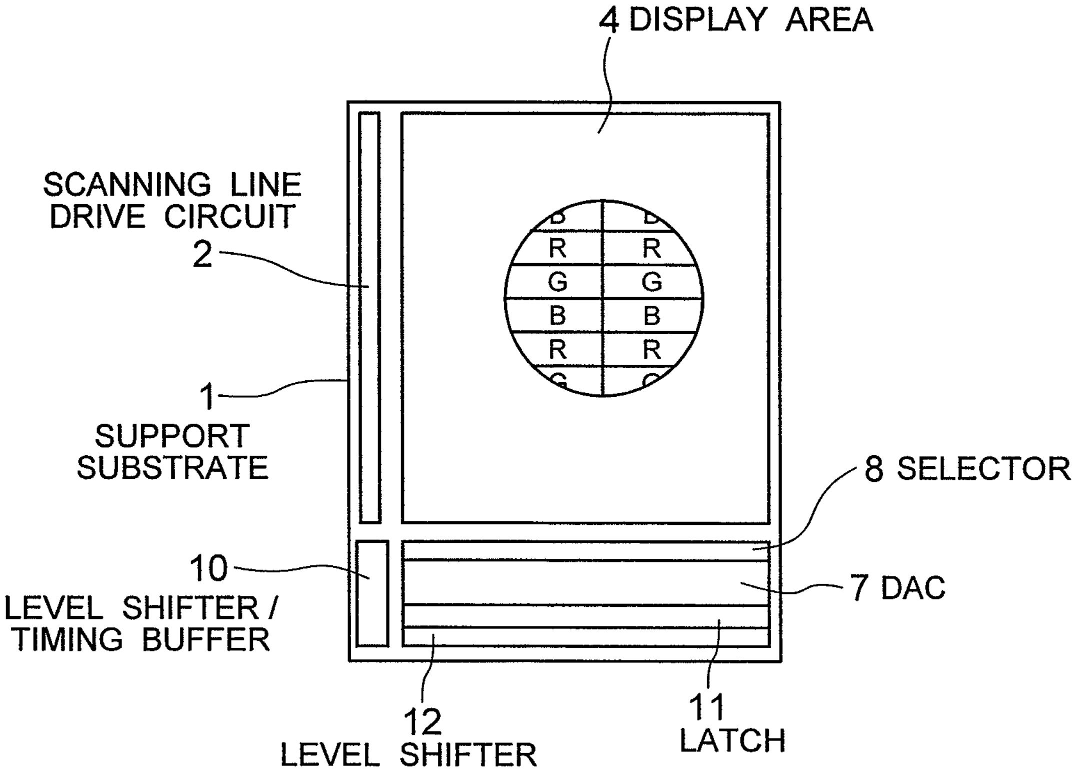
FIG. 3 is a plan view for showing a third embodiment of the display apparatus according to the present invention.

FIG. 3 is a plan view for showing a third embodiment of the display apparatus according to the present invention. There will be explanations provided hereinafter by referring to the drawing.

This embodiment employs a structure that decreases the power consumed in an interface part through processing data in parallel by extending the bus width of data from an external IC. This structure is disclosed in Patent Literature 1. That is, in this embodiment, a display area 4 in which pixels are provided in matrix, a scanning line drive circuit 2 for driving scanning lines, and a signal line drive circuit (described later) which performs data processing in parallel by extending the bus width between outside are provided on a support substrate 1. The pixel within the display area 4 is constituted with a plurality of dots. Each dot corresponds to a color filter of a certain color. The dot is in a laterally long shape, i.e. in a shape extending in a direction along the scanning lines. In other words, each dot is in a shape extending in parallel with the longitudinal direction of the signal line drive circuit.

In this embodiment, a controller IC (not shown) is provided outside the display apparatus. The controller IC includes a controller, a memory, and an output buffer, and it is connected to the support substrate 1. The support substrate 1 comprises a level sifter/timing buffer 10, the scanning line drive circuit 2, a level shifter 12, a latch circuit 11, a DAC circuit 7, a selector 8, and the display area 4 being built-in thereon, and it is connected to the controller IC. The level shifter circuit 12, the latch circuit 11, the DAC circuit 7, and the selector circuit 8 are lined in this order, and the selector circuit 8 is connected to the display area 4 side. This signal line drive circuit is constituted with the level shifter circuit 12, the latch circuit 11, the DAC circuit 7, and the selector circuit 8.

The circuit structure in this embodiment is also complicated like the case of the second embodiment, so that the effect of reducing the scale of the entire drive circuit can be obtained. Further, the length of the signal line drive circuit can be reduced so that the frame becomes smaller.

Figure 4:
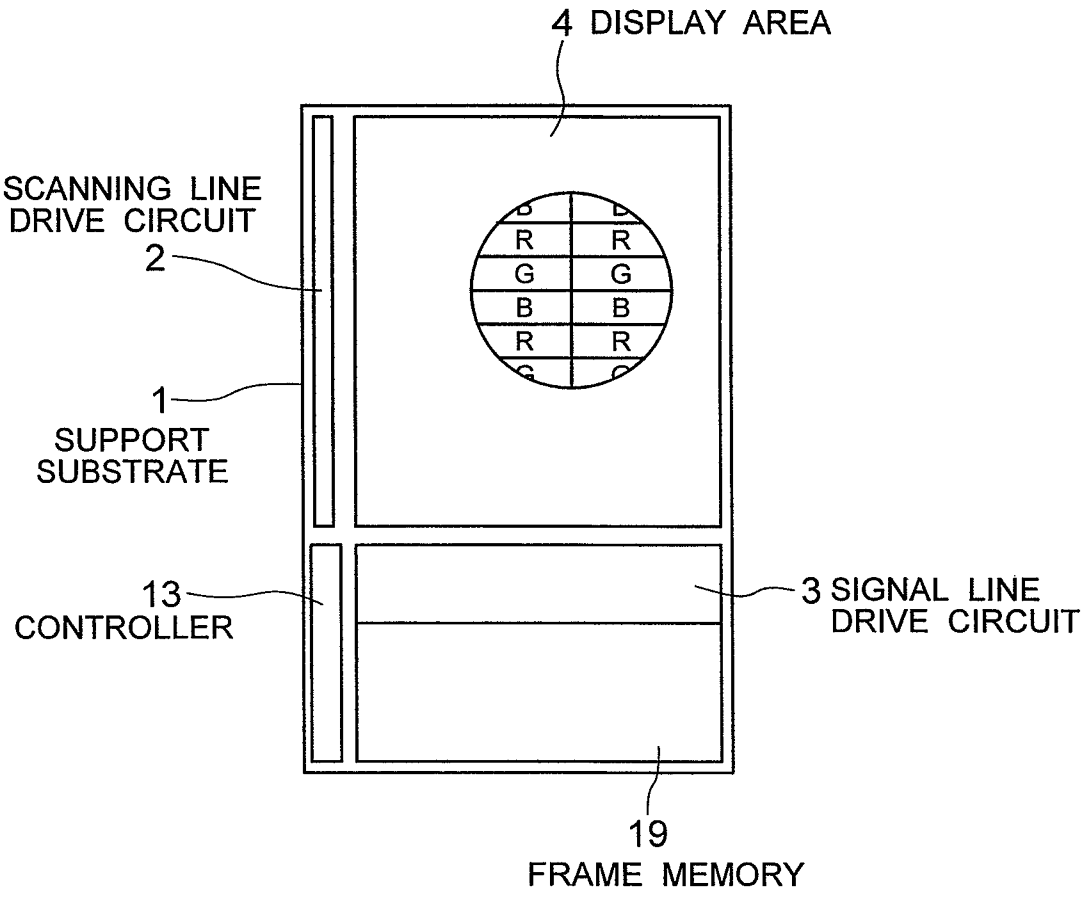
FIG. 4 is a plan view for showing a fourth embodiment of the display apparatus according to the present invention.
Figure 5:
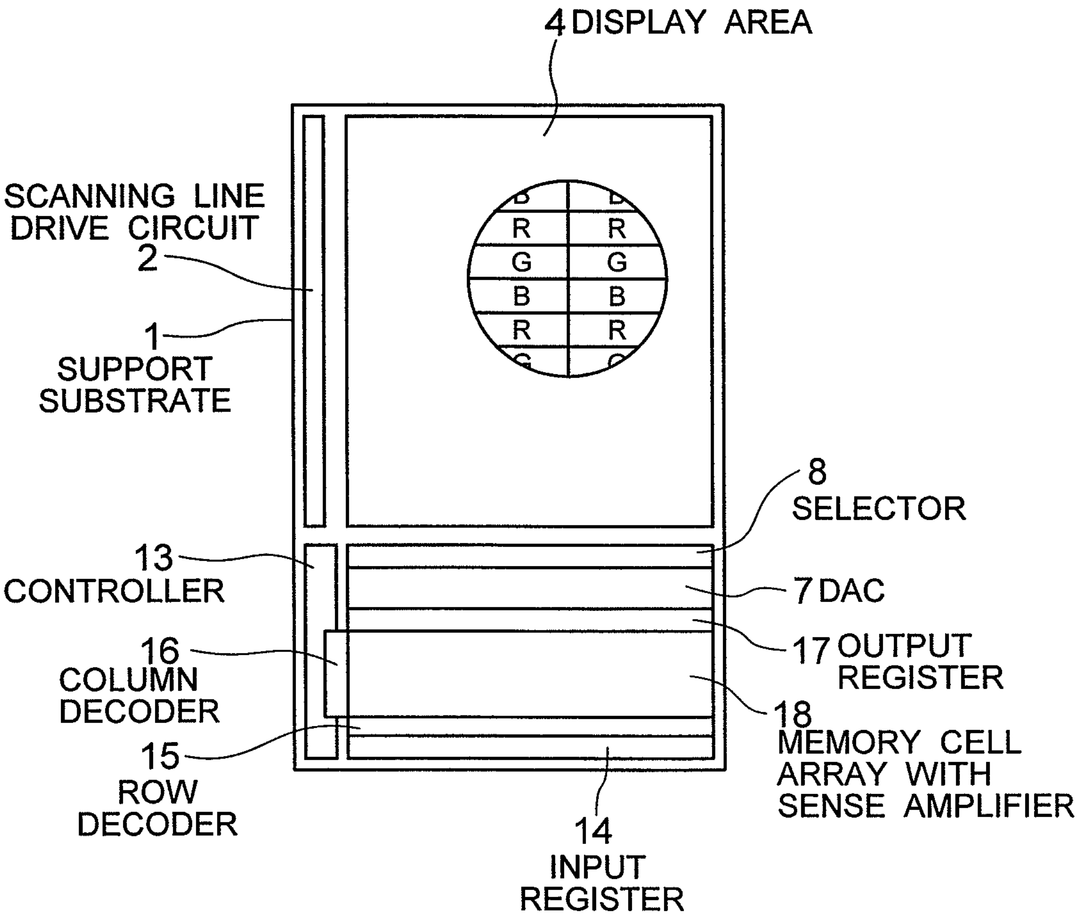
FIG. 5 is a plan view for showing an example of the signal line drive circuit shown in FIG. 4.
Figure 6:
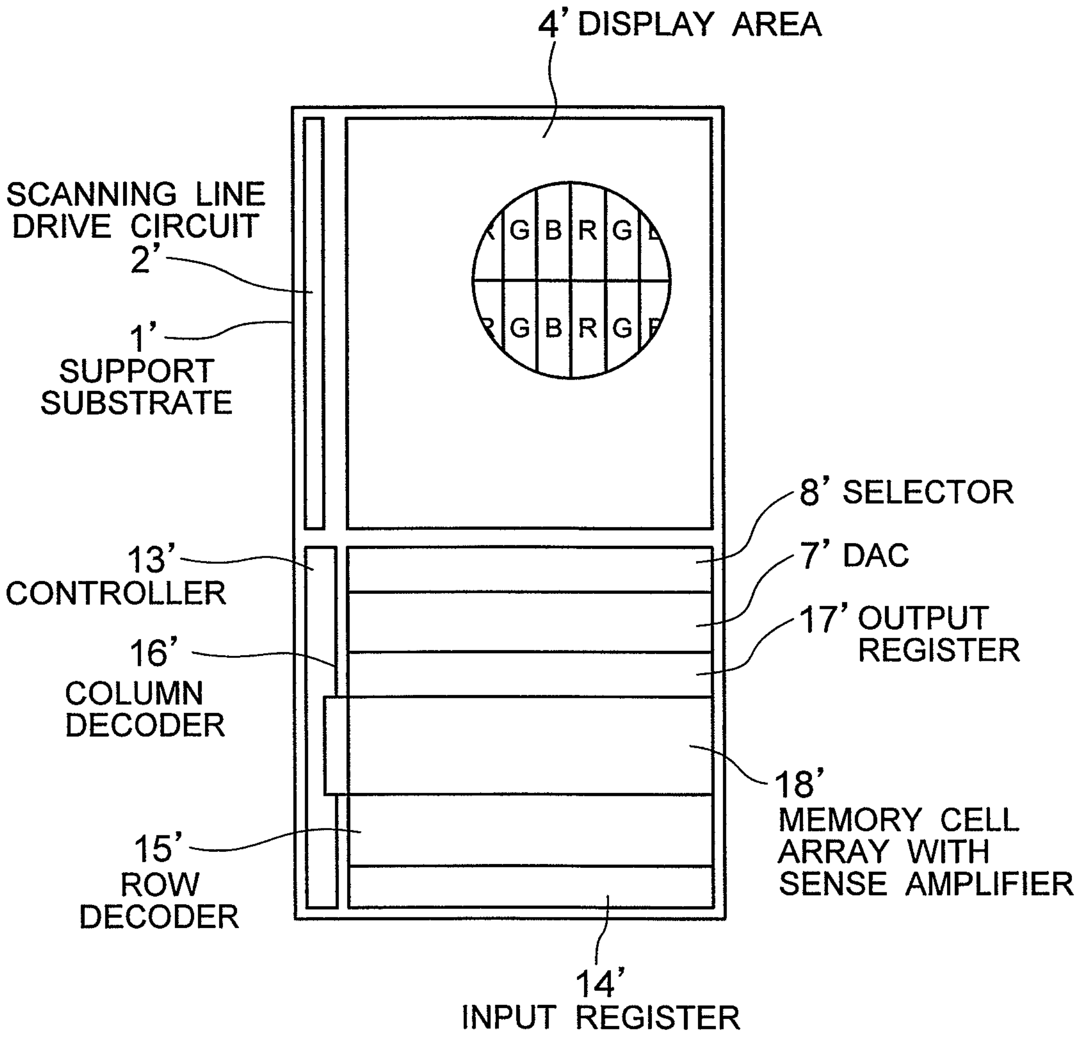
FIG. 6 is a plan view for showing Comparative Example 2.

FIG. 4 is a plan view for showing a fourth embodiment of the display apparatus according to the present invention. FIG. 5 is a plan view for showing an example of the signal line drive circuit in FIG. 4. FIG. 6 is a plan view for showing a conventional display apparatus (referred to as "Comparative Example 2" hereinafter). There will be explanations provided hereinafter by referring to those drawings.

In this embodiment, the circuit structure is more complicated than those of the first to third embodiments. The most significant difference between the first to third embodiments is that the frame memory is integrated on a support substrate. That is, in the fourth embodiment, a display area 4 in which pixels are provided in matrix, a scanning line drive circuit 2 for driving scanning lines, a signal line drive circuit 3, a frame memory 19, and a controller 13 are provided on a support substrate 1. The pixel within the display area is constituted with a plurality of dots. Each dot corresponds to a color filter of a certain color. The dot is in a laterally long shape, i.e. in a shape extending in a direction along the scanning lines. In other words, each dot is in a shape extending in parallel with the longitudinal direction of the signal line drive circuit 3.

More specifically, the circuit part of the signal line drive circuit 3 and the frame memory 19 is constituted with a selector 7, a DAC 8, an output register 14, a row decoder 15, a column decoder 16, a memory cell array 18 with a sense amplifier, and an input register 17 as shown in FIG. 5, for example. This detailed structure of the circuit is not limited to the structure shown in FIG. 5, but various kinds of structures can be employed depending upon the structure of the display apparatus.

Further, as Comparative Example 2, FIG. 6 shows a case of using color filters of vertical stripe type with the same circuit structure shown in FIG. 5. As can be seen from the comparison of FIG. 5 and FIG. 6, the layout area of the circuit on the signal line side is almost the same as that of the display area in Comparative Example 2. Meanwhile, the layout area of the circuit is drastically reduced in this embodiment. Like this, the effect of the embodiment becomes particularly prominent as the scale of the circuit becomes larger.

Figure 20:
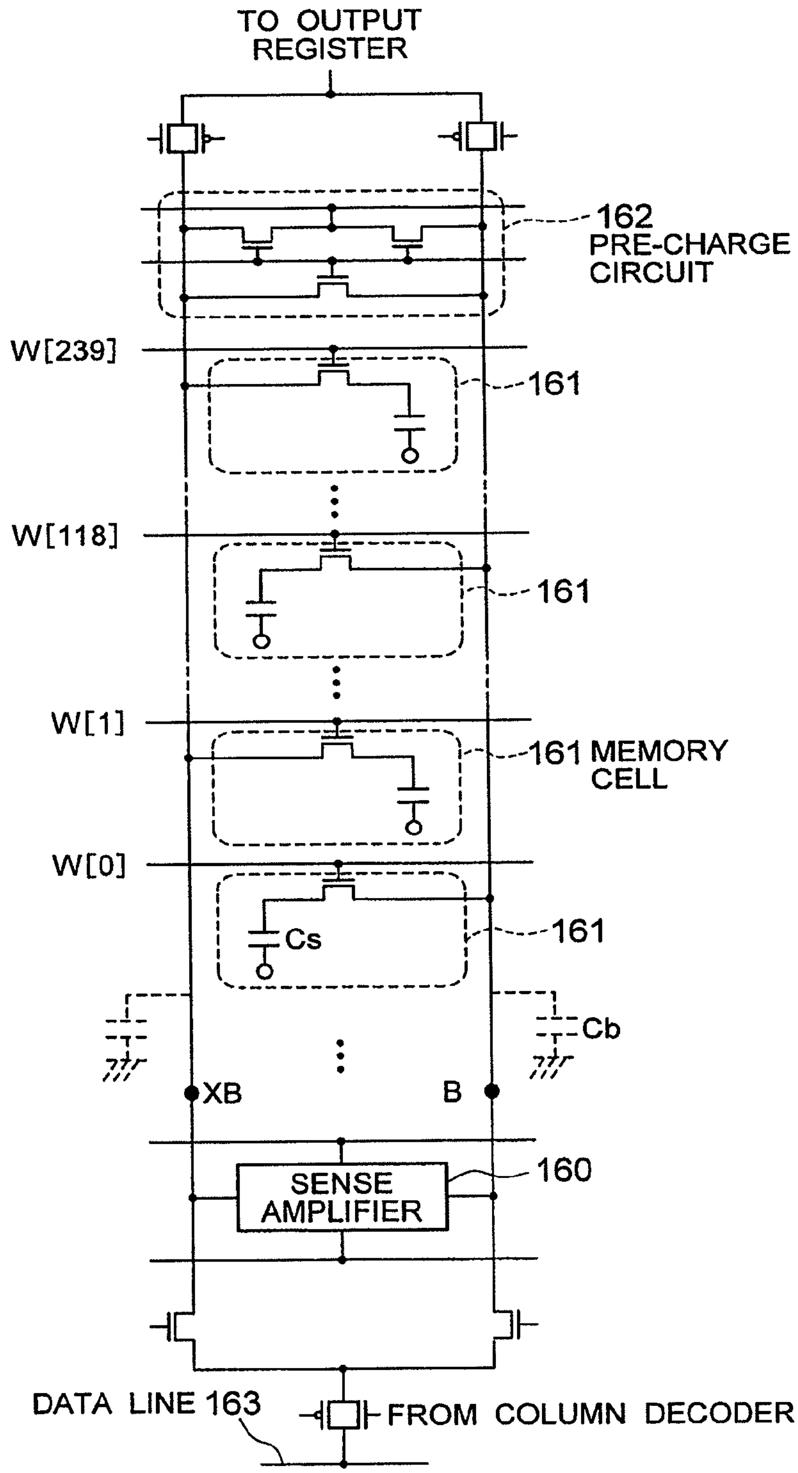
FIG. 20 is a circuit diagram for showing a conventional memory cell array with a sense amplifier for one-bit line.

Looking at the effect of the embodiment, it is particularly prominent in the row decoder and the sense amplifier of the frame memory. The row decoder is a circuit provided at every rows of the frame memory. When a single row of the frame memory corresponds to a single row of the signal lines, it is necessary in Comparative Example 2 to arrange the circuits in the region with an extremely narrow pitch. Similarly, the sense amplifier is also provided at every rows. The structure of the sense amplifier is as shown in FIG. 20, for example, in which a bit pair is provided to every rows and a sense amplifier circuit is provided between the pair. Further, normally, two wirings are provided in the top and bottom as in FIG. 20, for example, for supplying the electricity to the sense amplifier circuit. The effect of the embodiment is numerically checked by referring to the case of this sense amplifier circuit.

Figure 7:
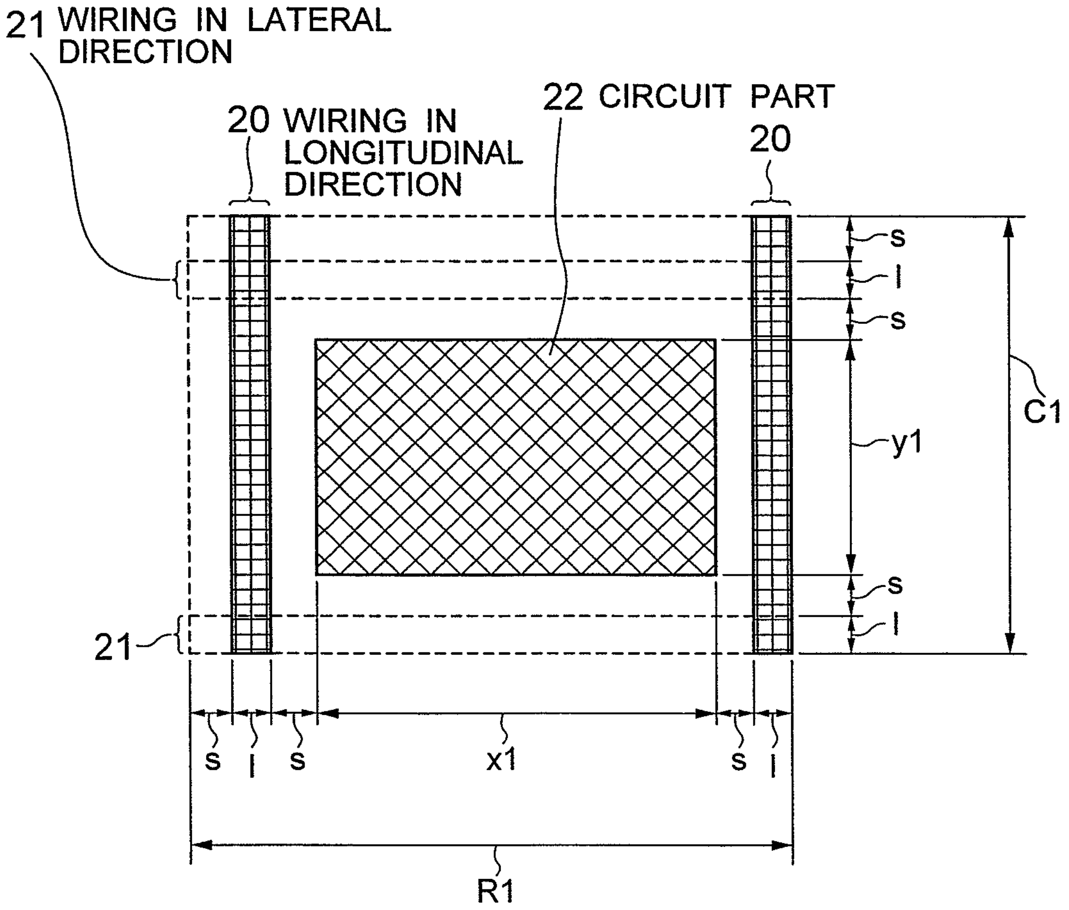
FIG. 7 is a plan view for showing an example of the layout of a circuit part that is surrounded by wirings according to a fourth embodiment of the present invention.

First, there is considered the layout according to the embodiment for the sense amplifier circuit part as shown in FIG. 7. This drawing shows a circuit part 22 (sense amplifier part) sandwiched between two longitudinal wirings 20 (a pair of bit lines). This circuit is also sandwiched between two lateral wirings 21 (power supply wirings). This whole layout area is in a size of R1 laterally and C1 longitudinally. The two longitudinal or lateral wirings are designed to be in a prescribed size that is defined in the design rule, so that this circuit does not to interfere with another neighboring circuit in terms of the layout. Here, the width of the wiring is shown as 1, and the space between the wiring and the circuit is shown as s.

Defining the relation between the wiring (line) and the space, the size of the circuit part 22 is x1 in the lateral direction and y1 in the longitudinal direction. Referring to FIG. 7, the following equations can be obtained.

$$R1 = x1 + 3s + 2l \tag{3}$$

$$C1 = y1 + 3s + 2l \tag{4}$$

That is, in addition to the width of the circuit part, the width for three spaces and the widths for two wirings are necessary in the lateral direction and longitudinal direction of a single circuit area. For simplifying the following calculations, a following equation is applied.

$$c \cdot R1 = 3s + 2l \tag{5}$$

A following equation can be obtained, provided that the lateral direction and the longitudinal direction of the designed circuit part 22 can be expressed as the ratio, and the ratio of the longitudinal direction to the lateral direction is b.

$$y1 = b \cdot x1 \tag{6}$$

Using this relation, the area (R1·C1) of the entire layout area can be expressed as follows with R1, c, and b.

$$R1 \cdot C1 = \{c + b(1-c)\} \cdot R1^2 \tag{7}$$

Figure 8:
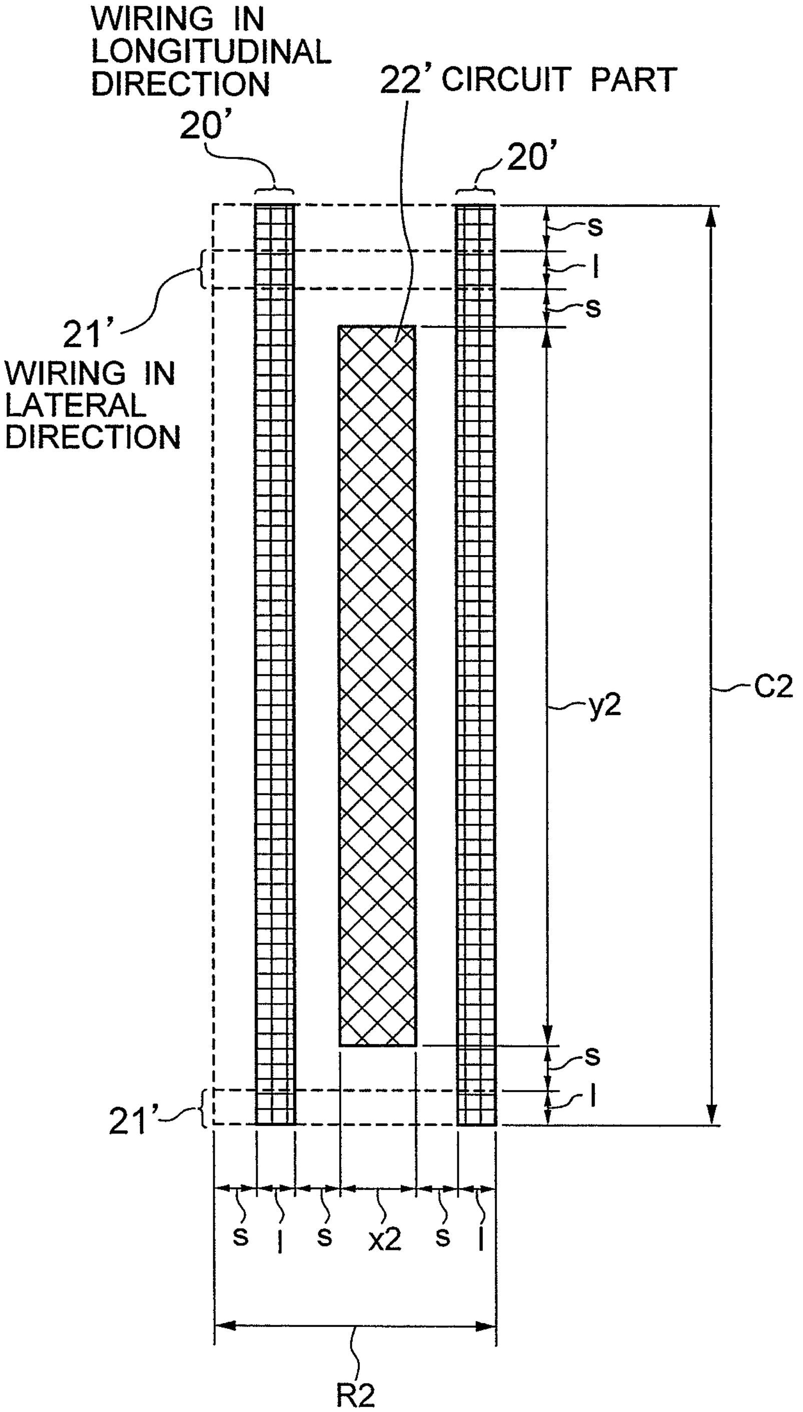
FIG. 8 is a plan view for showing an example of the layout of a circuit part that is surrounded by wirings according to Comparative Example 2.

Meanwhile, FIG. 8 shows the layout according to Comparative Example 2 for the sense amplifier circuit part. As in FIG. 7, the entire layout area in this drawing is in a size of R2 laterally and C2 longitudinally. Further, the size of the circuit part 22' is x2 in the lateral direction and y2 in the longitudinal direction.

It is assumed here that the number of colors for the color filter is k. It is assumed that the color filters of whole colors are arranged in a vertical stripe form in Comparative Example 2, and the color filters of whole colors are arranged in a lateral stripe form in the embodiment. With this, a following relation is established between the lateral width R2 and lateral width R1 of the respective layout areas.

$$R1 = k \cdot R2 \tag{8}$$

That is, the size of the layout area in the lateral direction of this embodiment is k times as large as that of Comparative Example 2. The same relations as expressed in equations (3) and (4) apply between R2 and x2 as well as between C2 and y2, and the width for three spaces and the width for two wirings are required in addition to the width of the circuit part.

x2 can be expressed as follows with R1, c, and k.

$$x2 = R2 - (3s + 2l) = R1/k - c \cdot R1 = R1 \cdot (1 - c \cdot k)/k \tag{9}$$

Meanwhile, a following equation can be obtained, since the area of the circuit part according to the present invention is equal to that of the conventional technique.

$$x1 \cdot y1 = x2 \cdot y2 \tag{10}$$

From this equation and the equations (3), (5), (6), and (9), y2 can be expressed as follows with R1, b, c, and k.

$$y2 = (x1 \cdot y1)/x2 = (b \cdot x1^2 \cdot k)/\{R1 \cdot (1 - c \cdot k)\} = \{b \cdot (1-c)^2 \cdot k \cdot R1\}/(1 - c \cdot k) \tag{11}$$

By using the equations (8) and (11), the area (R2·C2) of the entire layout in Comparative Example 2 can be expressed as follows with R1, b, c, and k.

$$R2 \cdot C2 = (x2 + 3s + 2l) \cdot (y2 + 3s + 2l) = (R1/k) \cdot (y2 + c \cdot R2) = (R1/k) \cdot [\{b \cdot (1-c)^2 \cdot k\}/(1 - c \cdot k) + c] \cdot R1 = [(c/k) + \{b \cdot (1-c)^2\}/(1 - c \cdot k)] - R1^2 \tag{12}$$

The area of the entire layout according to the embodiment and that of Comparative Example 2 can be compared through a comparison of the results obtained from equation (7) and equation (12). The condition with which the area of the layout according to the embodiment becomes smaller is when the following relation is established.

$$R2 \cdot C2 > R1 \cdot C1 \tag{13}$$

Through substituting the equations (7) and (12) to the inequality (13) and sorting it out, a following relation can be obtained.

$$(k-1)\{(b+c)\cdot k-1\}>0 \quad (14)$$

The condition with which the aforementioned inequality (14) applies is that following inequalities are satisfied simultaneously.

$$k>1 \quad (15)$$

$$b+c>1/k \quad (16)$$

The inequality (15) indicates the condition that the color is not a single color but there are a plurality of colors. Further, the inequality (16) indicates the condition that b+c, which is the sum of the ratio b between the lateral side and the longitudinal side of the circuit part according to the layout of the present invention and the proportion c of the wiring and the space occupying the lateral pitch R1 of the entire layout, is larger than the reciprocal of the number of colors k. When the scale of the circuit is very small, the ratio b between the lateral side and the longitudinal side of the circuit part can be reduced extremely.

However, there is a limit in reducing the ratio of the lateral side to the longitudinal side when the circuit structure is complicated as in the embodiment. For example, when the number of colors, k, is 3, the inequality (16) always applies if b is ⅓ or larger. Further, the inequality (16) applies even if b=0.3, as long as c>1/30. For example, under a condition that the wiring width l is 8 μm and the space is 6 μm, the inequality (16) can be satisfied if the lateral pitch R1 is 1020 μm or less. Like this, it can be understood that the effect of the embodiment can be achieved depending on the design and the process condition. It is rare for the ratio b between the lateral and longitudinal sides of the circuit part to be less than ½ in a normal design, so that it is understood that the effect of the embodiment can be achieved at all times.

Furthermore, the relation obtained here can be applied to the memory cell. That is, the memory cell part is surrounded by bit line pair and sandwiched between a word line and a capacitive common electrode. As a result, it is also possible with the embodiment to reduce the area of layout for the memory cell, when the inequality (16) is satisfied. The memory cells are arranged in the longitudinal direction by corresponding to a plurality of word lines. Thus, when the area of layout for a single memory cell part is reduced, the area of layout for the entire memory cell array can be reduced drastically.

When the circuit structure is complicated as in this case, it is possible to obtain the effect of reducing the layout scale of the circuit part as expressed with the inequality (16), even if the display area is extremely long in the longitudinal direction, and it does not satisfy the inequality (2). Here, it has been described by referring to the case of the frame memory, however, it is obvious that the same effect can be obtained with other circuits. In addition, similar expression can be obtained for the circuits that are surrounded by a single wiring in the longitudinal direction and a single wiring in the lateral direction, unlike the case of the above-described study.

That is, the effect of the embodiment can be achieved on condition that the ratio d of the widths occupied by the wiring and the space to the lateral pitch R1 has a relation of an equation (17), and the inequality (15) and an inequality (18) are satisfied.

$$d\cdot R1=2s+1 \quad (17)$$

$$b+d>1/k \quad (18)$$

From the inequality (18), it can be understood that the effect of the embodiment can be achieved at all times when the circuit becomes complicated to some extent or more.

As the effects of the first to fourth embodiment, there have been described a reduction in the area for the circuit, reduction in the frame by reducing the circuit length, cut in the cost by shortening the development time, shortening LT, improvements in the reliability, cut in the cost by an increase in the number of products obtained from a single support substrate, reduction in the weight by reducing the frame, etc. An example of other effects not presented above will be described by referring to the accompanying drawings.

Figure 9:
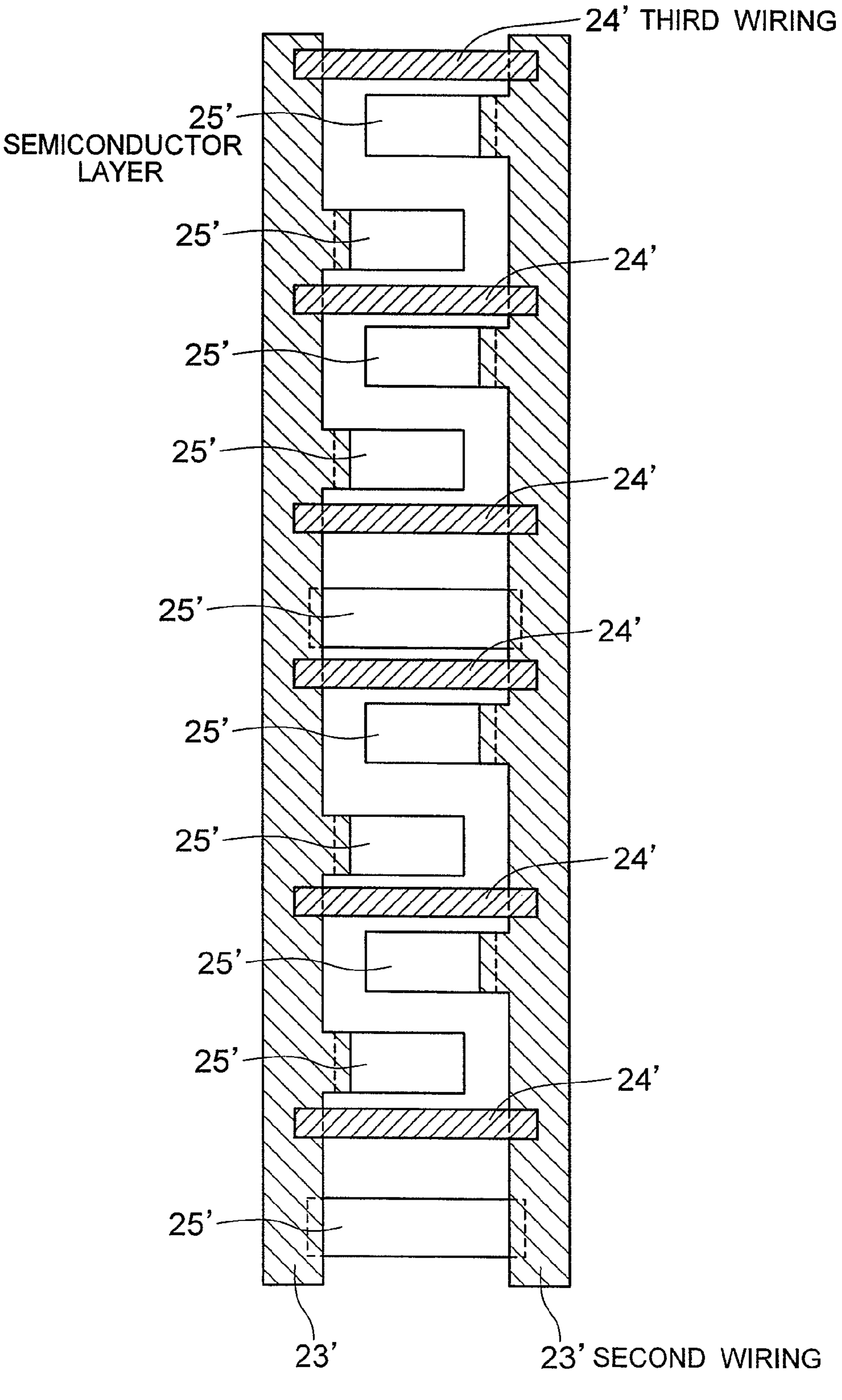
FIG. 9 is a plan view for showing an example of the layout of a circuit part according to a conventional technique.
Figure 10:
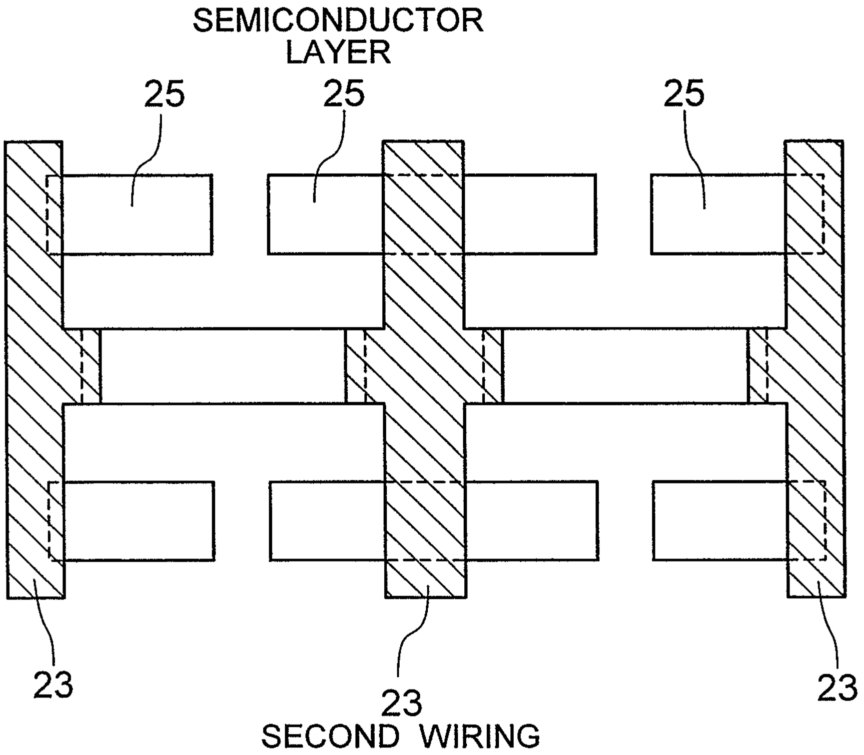
FIG. 10 is a plan view for showing an example of the layout of a circuit part according to the present invention.

FIG. 9 is an example of a layout design of a circuit according to a conventional technique. Further, FIG. 10 is an example showing a layout design of the same circuit according to the present invention. In these drawings, semiconductor layers 25, 25', second wirings 23, 23', a third wiring 24', and the like are illustrated. For avoiding complication, first wirings are not illustrated therein. Further, a part of the second wirings is not illustrated, either.

In FIG. 9, a circuit constituted with the semiconductor layer 25' and the like is arranged in the area that is surrounded by two second wirings 23'. The semiconductor layer 25' is divided into a plurality of pieces since the space between the two second wirings 23' is narrow. Further, the third wiring 24' is used to draw around the wirings.

Meanwhile, the number of dividing the semiconductor layer 25 in the layout of the same circuit shown in FIG. 10 is less than that of FIG. 9. Further, the area occupied by the second wirings 23 is reduced as well. Furthermore, the third wiring is not used herein. Like this, when designing the layout of the same circuit, the present invention enables not only reduction of the area for the circuit but also designing the layout without using an additional wiring. To use less number of wirings means a dramatic cut in the cost for the design and process.

As described above, the present invention is capable of designing the layout of the circuit without using an additional wiring layer, thereby achieving a drastic cost reduction. It is specifically important to mention that FIG. 9 shows the result of layout that is achieved by handwork of a skilled person in the field of the layout design, whereas FIG. 10 is a result of achieving automatic layout design from a net list on which the connection relation of the circuit is written. Not only the number of wiring layers is small but also the versatility of layout is increased, so that it is possible with the structure of the present invention to achieve the efficient layout design with the small area for the circuit even with the automatic designing. Therefore, the skilled person can be concentrated on other circuit parts. Like this, it also achieves an extremely large effect in terms of saving the labor for designing.

Further, it is another effect of the present invention that the resistance due to the parasitic capacitance and the wirings within the circuit can be decreased by reducing the circuit scale. By reducing those, load for transmitting data and clock within the circuit and supplying voltage to the circuit can be reduced extremely. As a result, the size of the buffer necessary for the data and the clock can be decreased. Furthermore, the performance required for the power supply circuit that supplies voltage can be suppressed. As a result, the circuit scale can be more decreased. At the same time, low power consumption can be achieved.

Conventionally, particularly when the circuit scale is large, the influence of the cross capacitance at the cross areas between the wirings is large, thereby causing data delay and dullness/disturbance in the clock waveform. In order to reduce the influence of the cross capacitance, it is necessary to: increase the film thickness of the insulating film at the area where the cross capacitance is formed, through changing the process; reduce the capacitance by finely setting the process rule; and provide a large buffer and a circuit used exclusively for coping with delay/dullness/disturbance of the signals. With the present invention, however, such large changes in the process are not necessary. In addition, it only requires minimum use of the exclusive-use circuit and large buffer. Like this, the present invention has a large impact on both the process and the designing.

Figure 21:
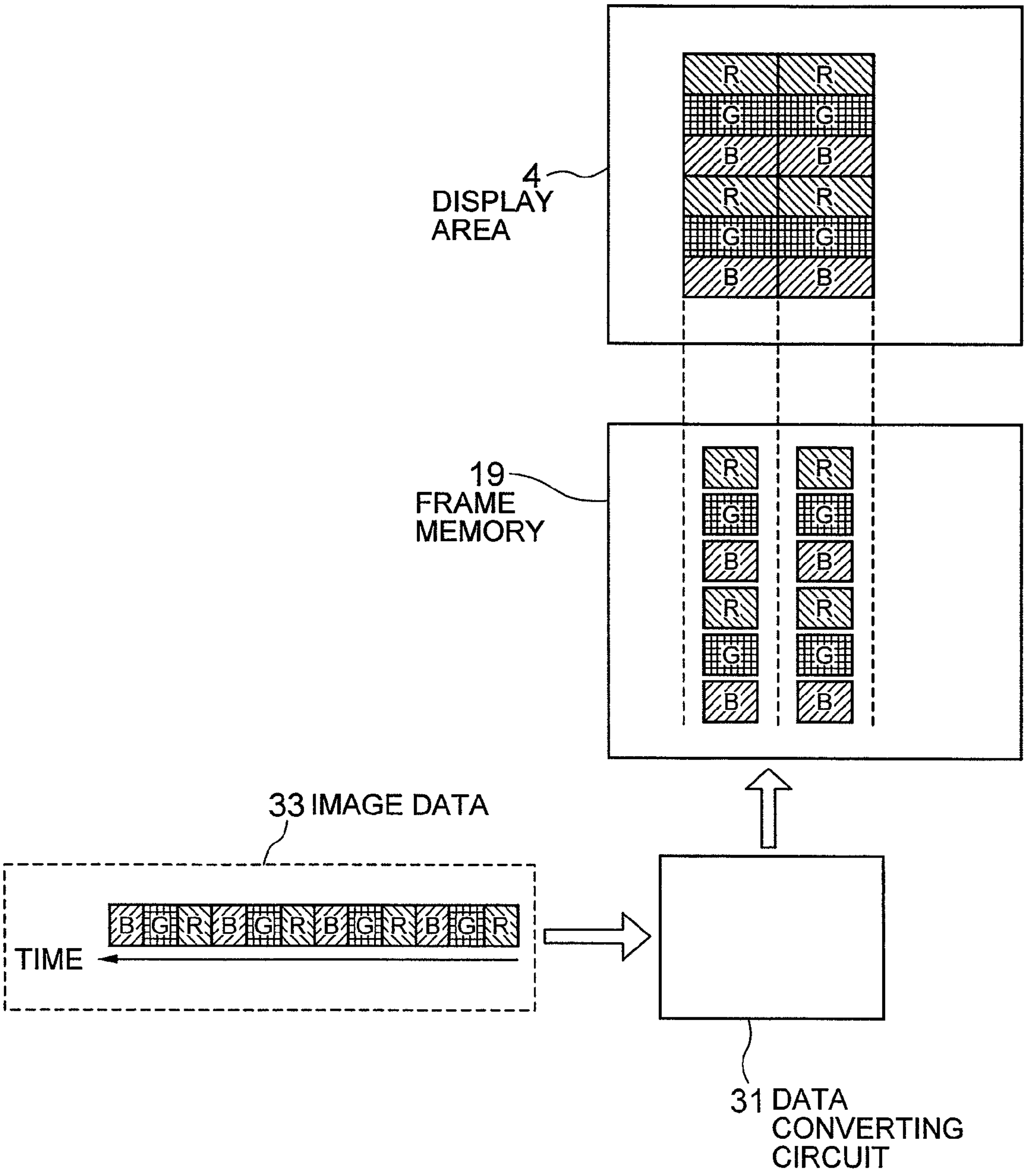
FIG. 21 is an illustration for showing an example of a method for storing data into the frame memory of the present invention.

With the present invention, it is possible to obtain more effects by devising a storing method of data within the frame memory, i.e. an arranging method of data written to the memory. FIG. 21 illustrates the concept of this method. In FIG. 21, the frame memory 19 is formed along with the display area 4 on the same substrate. Data format (for example, arranged order) of the inputted image data 33 is converted by a data converting circuit 31, and it is supplied to the display area 4.

By storing the data in this manner, it is possible to reduce the power consumed when reading out the data from the frame memory and displaying it on the display area. That is, only a small power is to be consumed, since it is unnecessary to rearrange the data in accordance with the array of the pixels in the display part when reading out the data. With the system having no built-in frame memory, normally, it is necessary to rearrange the data that is read out from an IC chip in accordance with the array of the pixels when displaying the data on the display area, which increases the power consumption.

Such data conversion can be achieved not only with the structure of FIG. 21, but also with various structures. For example, the inputted image data 33 may be serial data or parallel data.

Figure 22:
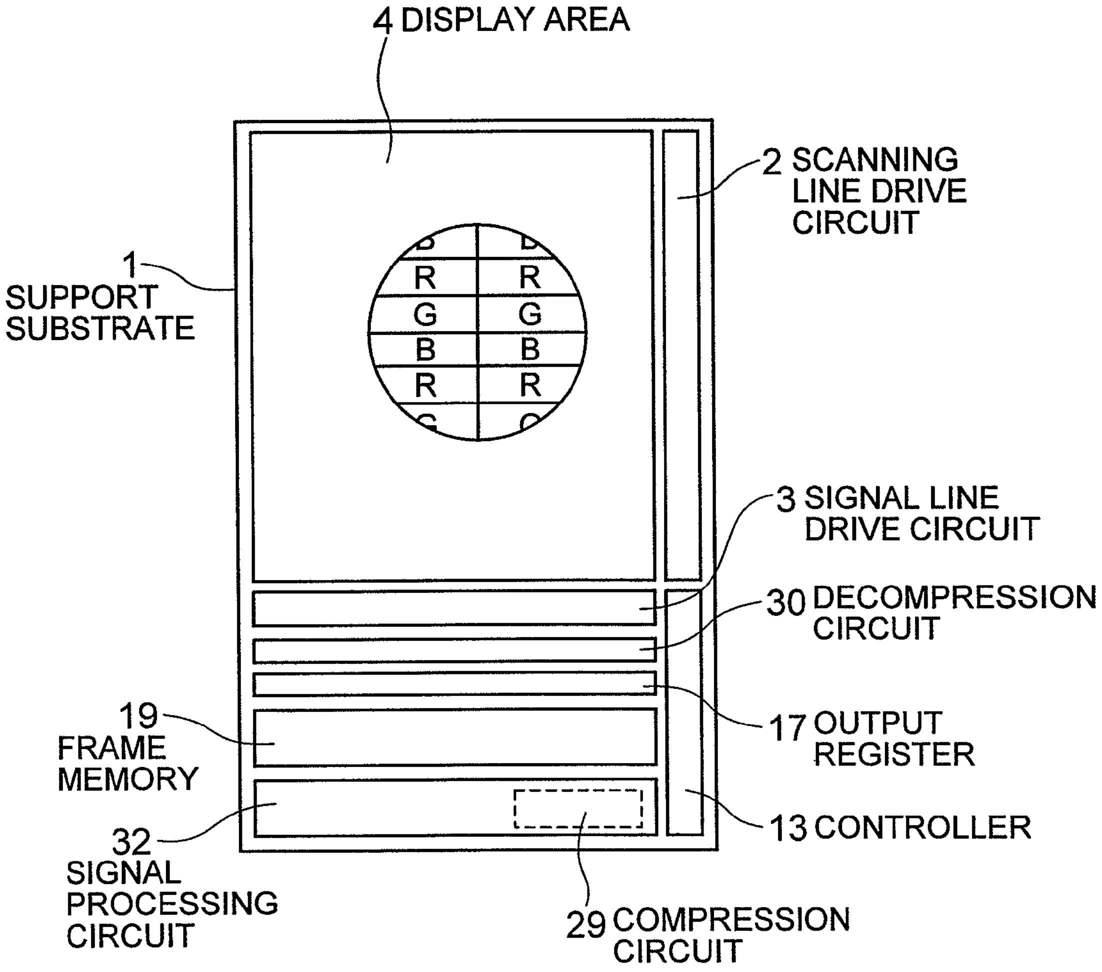
FIG. 22 is a block diagram for showing a system block of the liquid crystal display according to EXAMPLE of the present invention.

As EXAMPLE of the present invention, there will be described a design/fabricating example of a diagonally 1.1-inch color liquid crystal display with a built-in frame memory. For the number of pixels, there are 160 pixels laterally and 120 pixels longitudinally, and the resolution thereof is 180 ppi. FIG. 22 is system block diagram of the liquid crystal display fabricated in this EXAMPLE, which corresponds to FIG. 5 described above. In this liquid crystal display, a large number of circuits are formed along a display area 4 on a same support substrate 1. Specifically, formed are a scanning line drive circuit 2, a signal line drive circuit 3, a compression circuit 29, a decompression circuit 30, a controller 13, an output register 17, a frame memory 19, and a signal processing circuit 32. In FIG. 22, the compression circuit 29 is included within the signal processing circuit 32. For providing a built-in frame memory, it is preferable for the lateral width of the display area 4 and that of the frame memory 19 to be almost equal. Further, it is preferable that the array of the memory cell within the frame memory 19 correspond to the array of the pixels within the display area 4, so that the data can be written to all the pixels that are connected to a single scanning line by simply selecting one column in the frame memory. That is, with such structure, it is possible to decrease the power consumed when reading out the data, through performing the data conversion that is shown in FIG. 21.

Figure 23:
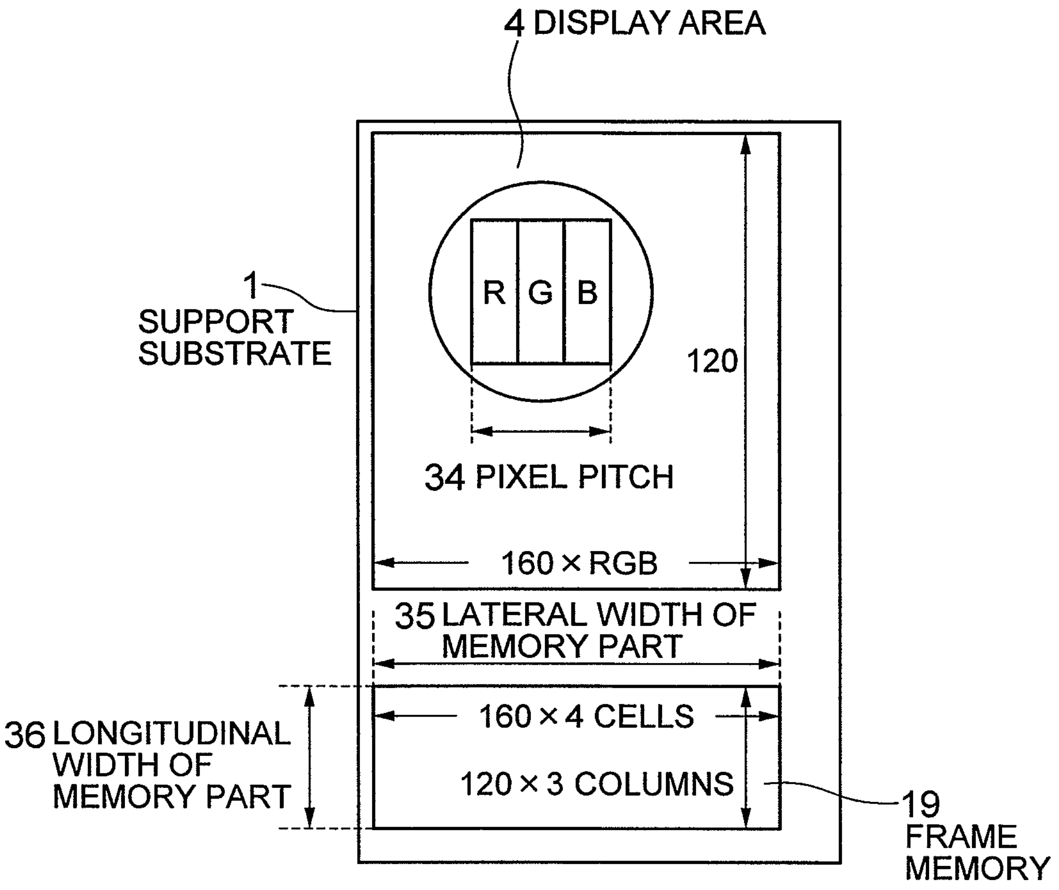
FIG. 23 is an illustration of a Comparative Example of the present invention, which shows the layout of the memory part and the pixel array when the frame memory is formed in the liquid crystal display with the longitudinal stripe type pixels.
Figure 24:
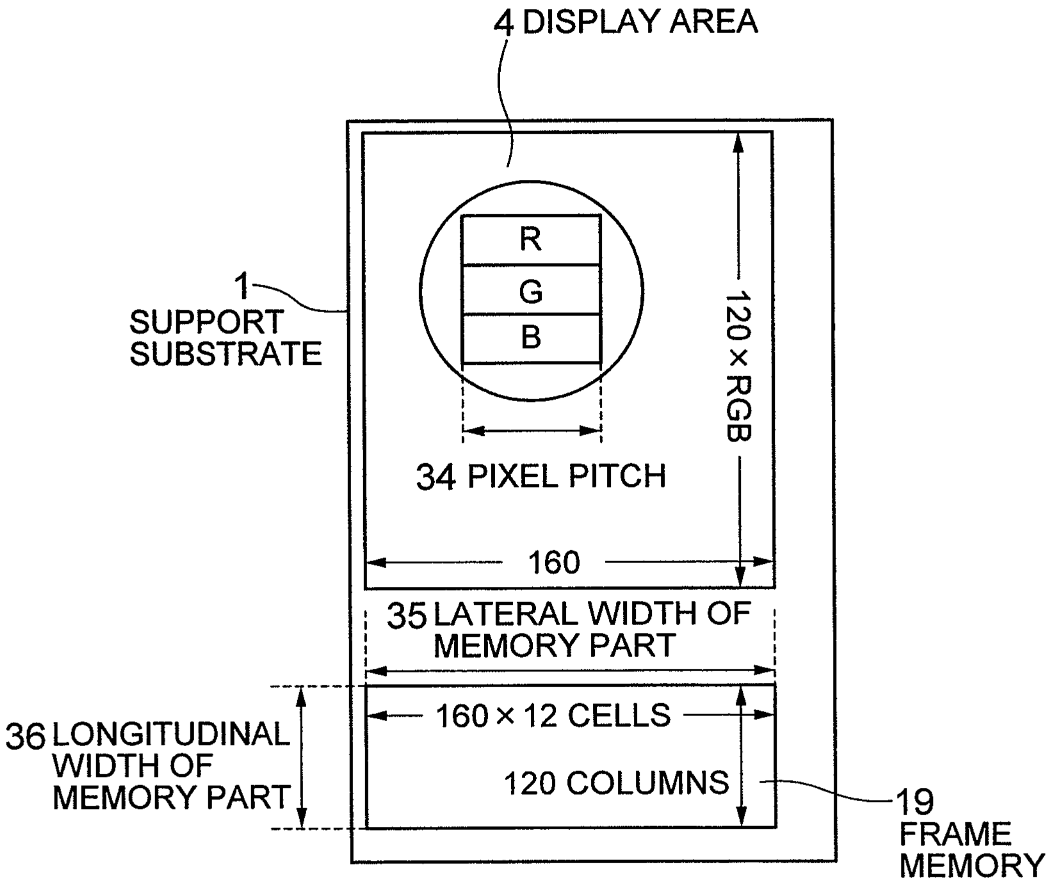
FIG. 24 is an illustration of the EXAMPLE of the present invention, which shows the layout of the memory part and the pixel array when the frame memory is formed in the liquid crystal display with the lateral stripe type pixels.

In order to investigate the effectiveness of the layout of the present invention, there will be shown the pixel structure of the present invention where the pixels are arranged in the lateral stripe direction and, as a comparison, the pixel structure where the pixels are arranged in the longitudinal stripe direction. It is assumed here that the frame memory 19 has a memory capacity of 4 bits for each color pixel. FIG. 23 illustrates a Comparative Example, showing the layout of the memory cell and the pixels within the display apparatus with the pixel structure arranged in the longitudinal stripe direction. FIG. 24 illustrates the case of the present invention, showing the layout of the memory cell and the pixels within the display apparatus with the pixel structure arranged in the lateral stripe direction. In the frame memory 19 of the longitudinal stripe structure shown in FIG. 23, there are 120 word lines being provided, each of which is connected with 160×12 memory cells. Further, the display area 4 of the longitudinal stripe structure is constituted with 160×RGB data lines and 120 scanning lines. Meanwhile, in the frame memory 19 of the lateral stripe structure shown in FIG. 24, there are 360 (120×3) word lines being provided, each of which is connected with 160×4 memory cells. Further, the display area 4 of the lateral stripe structure is constituted with 160 data lines and 120×RGB scanning lines.

Figure 25:
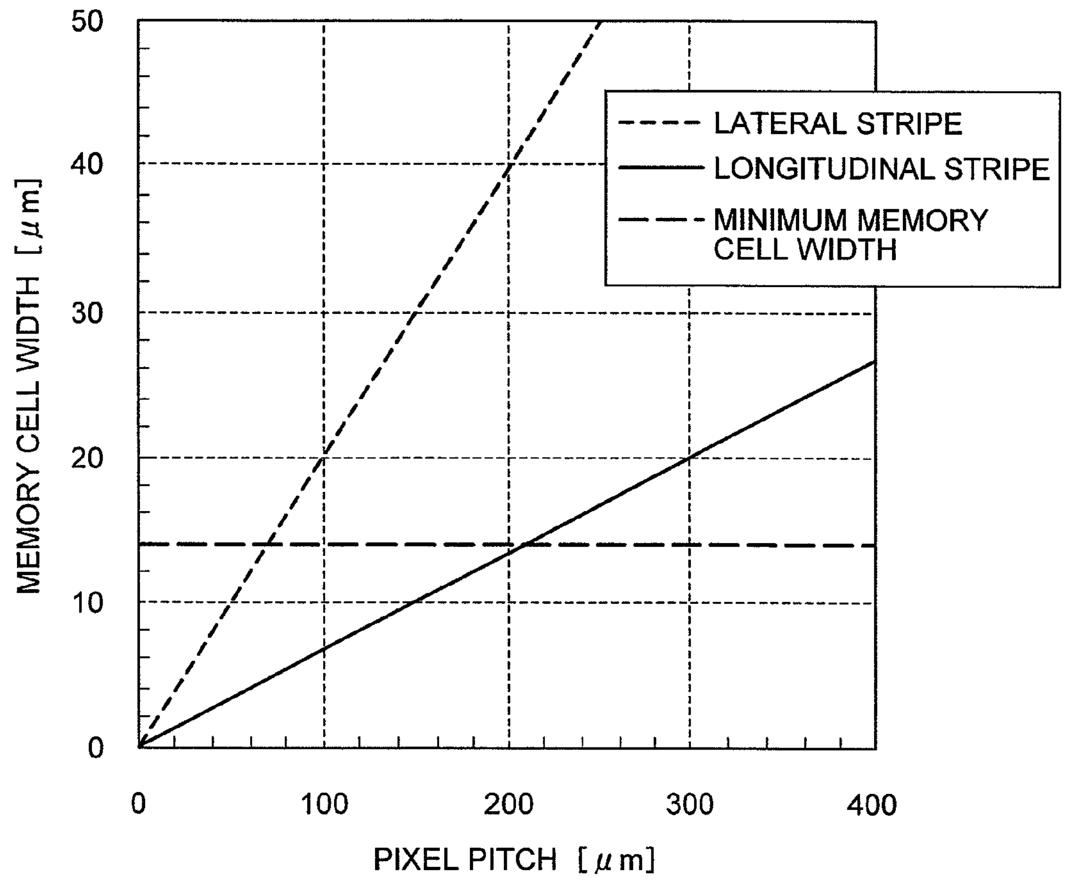
FIG. 25 is a graph for showing the relations between the pixel pitches and the memory cell widths of the EXAMPLE of the present invention and the Comparative Example.

With the longitudinal stripe structure shown in FIG. 23, it is necessary to arrange 12 memory cells (4 bits for each color=12 bits) as a total within the pixel pitch 34. Meanwhile, with the lateral stripe structure shown in FIG. 24, it is necessary to arrange 4 memory cells (4 bits) in the pixel pitch 34. FIG. 25 shows the relations between the pixel pitches and memory cell widths under these conditions, when it is designed in such a manner that the width of the frame memory 19 becomes the same as that of the display area 4. The relation for the longitudinal stripe structure and the relation for the lateral stripe structure are shown in FIG. 25, respectively. Further, the minimum memory cell width (14 μm in this case) that is restricted by the design rule used in this estimation is illustrated with a dotted line. In order to achieve the expected resolution of 180 ppi, it is necessary to set the pixel pitch to be about 141 μm. As can be seen from FIG. 25, the memory cell width becomes slightly smaller than 10 μm in the longitudinal stripe structure when the pixel pitch is 141 μm. That is, it is understood that the longitudinal stripe structure cannot be designed to have the resolution of 180 ppi with the assumed design rule. In order to design the longitudinal stripe structure with the resolution of 180 ppi, the design rule needs to be about a half the assumed value. Meanwhile, the memory cell width is slightly smaller than 30 μm in the lateral stripe structure when the pixel pitch is 141 μm. Thus, it can be seen that the lateral stripe structure can be designed sufficiently with the assumed design rule.

As described, with the structure of the present invention, it becomes possible to design the layout without changing the design rule. In addition, the layout can be designed very easily since it is sufficiently far from the limitation of design. Further, with the present invention, it is possible to achieve the design with the resolution of 360 ppi with the design rule assumed in FIG. 25. Like this, the present invention provides a large effect especially for the high-resolution display apparatus.

Next, the structure of FIG. 23 and the structure of FIG. 24 will be described from the view point of the action of the memory circuit. First, the specifications required for a normal action of the memory circuit surrounded by a pair of bit lines of the memory cells will be summarized. It is required to satisfy following equations, where the readout voltage difference between the pair of bit lines is ΔV, the memory capacity is Cs, and the supply voltage is Vdd.

$$\Delta V = \frac{C_s}{2(C_s + C_b)_{15}} V_{dd} \tag{19}$$

$$|\Delta V| > S \tag{20}$$

Figure 26:
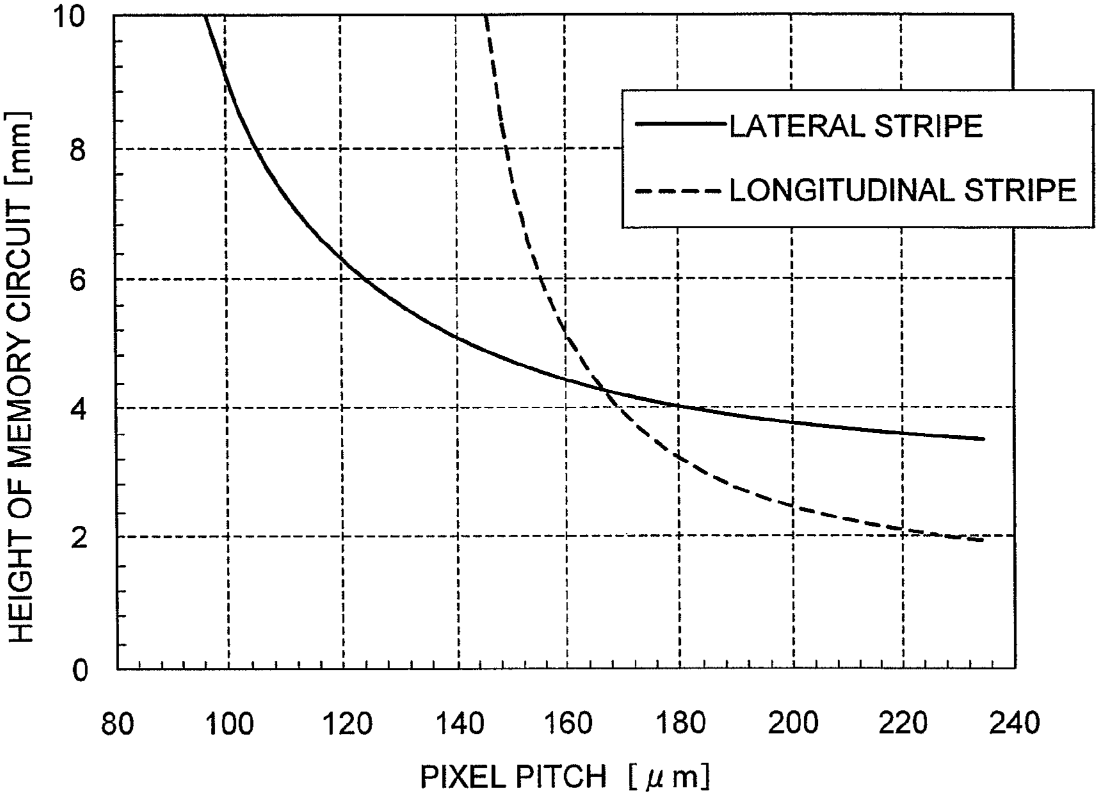
FIG. 26 is a graph for showing the relations between the pixel pitches and the heights of the memory circuits of the EXAMPLE of the present invention and the Comparative Example.

It is noted that Cb is a parasitic capacitance of the bit line. Further, S is the sensitivity of the sense amplifier within the memory circuit. Supposing that the supply voltage Vdd in the equation (19) is a fixed value, the voltage difference ΔV read out from the bit lines depends largely on the relation between the extents of the memory capacity Cs of the memory cell and the parasitic capacitance Cb of the bit line. The parasitic capacitance Cb of the bit line is increased as the height of the memory circuit is increased and the length of each bit line is extended. In order to maintain the readout voltage difference ΔV to be more than a certain value (to satisfy the equation (20)) by compensating the increased parasitic capacitance Cb, it is necessary to increase the memory capacity Cs. However, the height of the memory circuit is increased when the memory capacity Cs is increased, which further increase the parasitic capacitance of the bit line. FIG. 26 shows the calculated heights of the memory circuits determined under the circuit operating condition restricted by the equations (19) and (20), when the memory circuits are designed with the structures of FIG. 23 and FIG. 24. In FIG. 26, the horizontal axis takes the pixel pitch (μm) and the vertical axis takes the height (mm) of the memory circuit, and both the longitudinal stripe type and the lateral stripe type are plotted therein. In the design rule assumed herein, there is such a condition that the height of the memory circuit can be reduced more with the longitudinal stripe type, in the area where the pixel pitch is sufficiently large. In the meantime, the height of the memory circuit can be reduced more with the lateral stripe structure, when the pixel pitch becomes narrow. The reason for this is as follows. When the pixel pitch becomes narrow, the shape of the memory cell capacity becomes a more elongate shape with the longitudinal stripe type. As a result, the parasitic capacitance Cb is increased. When the parasitic capacitance Cb is increased, it is necessary to increase the cell capacity Cs, thereby further increasing the parasitic capacitance Cb. As a result, there is generated a condition that the circuit cannot be operated, when the pixel pitch becomes narrower than a certain extent. For example, it is the condition of having 180 ppi (the pixel pitch of 141 μm) which is assumed herein, and it is not possible to design the circuit with the longitudinal stripe type.

As described above, it can be seen that the present invention under the conditions of a certain design rule is effective from the view points of both restrictions that the widths of the display area 4 and the frame memory 19 in FIG. 25 are set almost equal and that whether the circuit shown in FIG. 26 is operated properly or not.

Figures 27A, 27B:
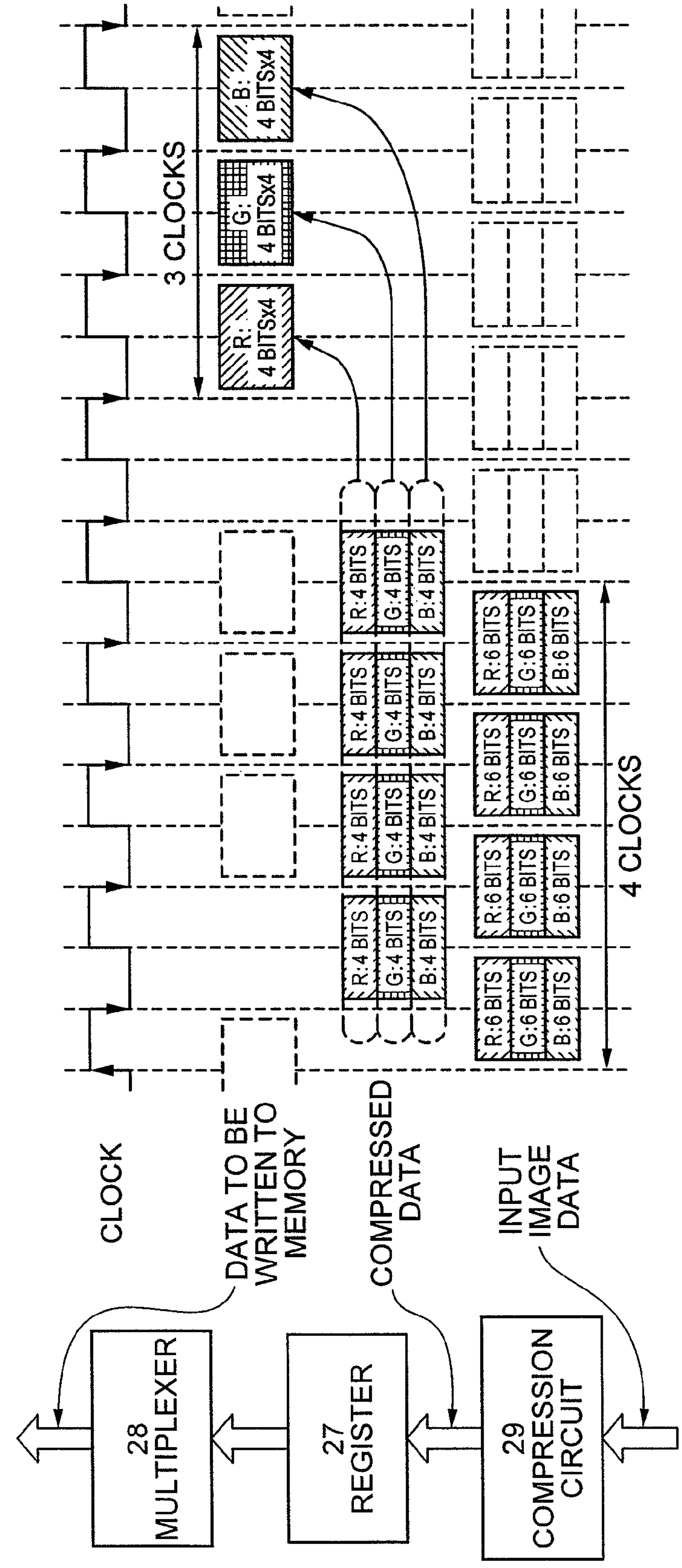
FIG. 27A is a block diagram for showing the structure of data conversion performed in the EXAMPLE of the present invention.
FIG. 27B is a timing chart thereof.

In order to achieve the structures shown in FIG. 22 and FIG. 24, data conversion shown in FIG. 21 is important. The details of data conversion that goes with this EXAMPLE will be described herein. In a conventional display apparatus, there is written the video data of one pixel by one clock (e.g. the data of one pixel with three dots of R, G, B), when writing the inputted video data to the frame memory. Meanwhile, in order to achieve the structure of the present invention, it is necessary to change the layout of the data that is corresponded to the conventional longitudinal stripe structure to the data that is arranged by corresponding to the lateral stripe structure. For achieving it in a simple way, it is necessary to use three clocks of the frequency that is three times that of the conventional case, since it is necessary to make an access to three word lines that are connected to R, G, B for writing the video data to the frame memory because the layout of the data in the frame memory corresponds to the layout of the pixels in the display area. To use the frequency of three times means that the operation speed required for the frame memory becomes three times or more. In order to avoid it, this EXAMPLE designs a signal processing circuit for performing processing in pipe-line form and provides it within the display apparatus. FIG. 27A shows a block diagram of the pipe-line type signal processing circuit, and FIG. 27B shows the timing chart. This circuit includes a compression circuit 29 to compress the inputted image data thereby, and generates the data to be written to the memory from the compressed data through a register 27 and a multiplexer 28. The data of 4 pixels with 6 bits for each color inputted by 4 clocks (data of 12 dots with 6 bits) is converted by the compression circuit 29 into the data of 4 pixels with 4 bits for each color. The compressed data of 4 pixels is temporarily held at the register 27. Further, the selection order of the data is changed at the multiplexer 28 in accordance with the order of writing to the memory, thereby forming the data to be written to the memory. The data to be written to the memory is constituted in such a manner to write the data of 4 bits/4 pixels for each color. In the drawing, the data is written in order of R, G, B. As a result, the data of 4 pixels is written to the memory by 3 clocks. With this structure, when reading out the data from the memory, it is possible to readout the data at once for each selected line, through rearranging the video data to be in the order that corresponds to the display area when writing it to the memory. Therefore, the number of accesses to the memory can be decreased, and the power consumption can be reduced.

Figure 29:
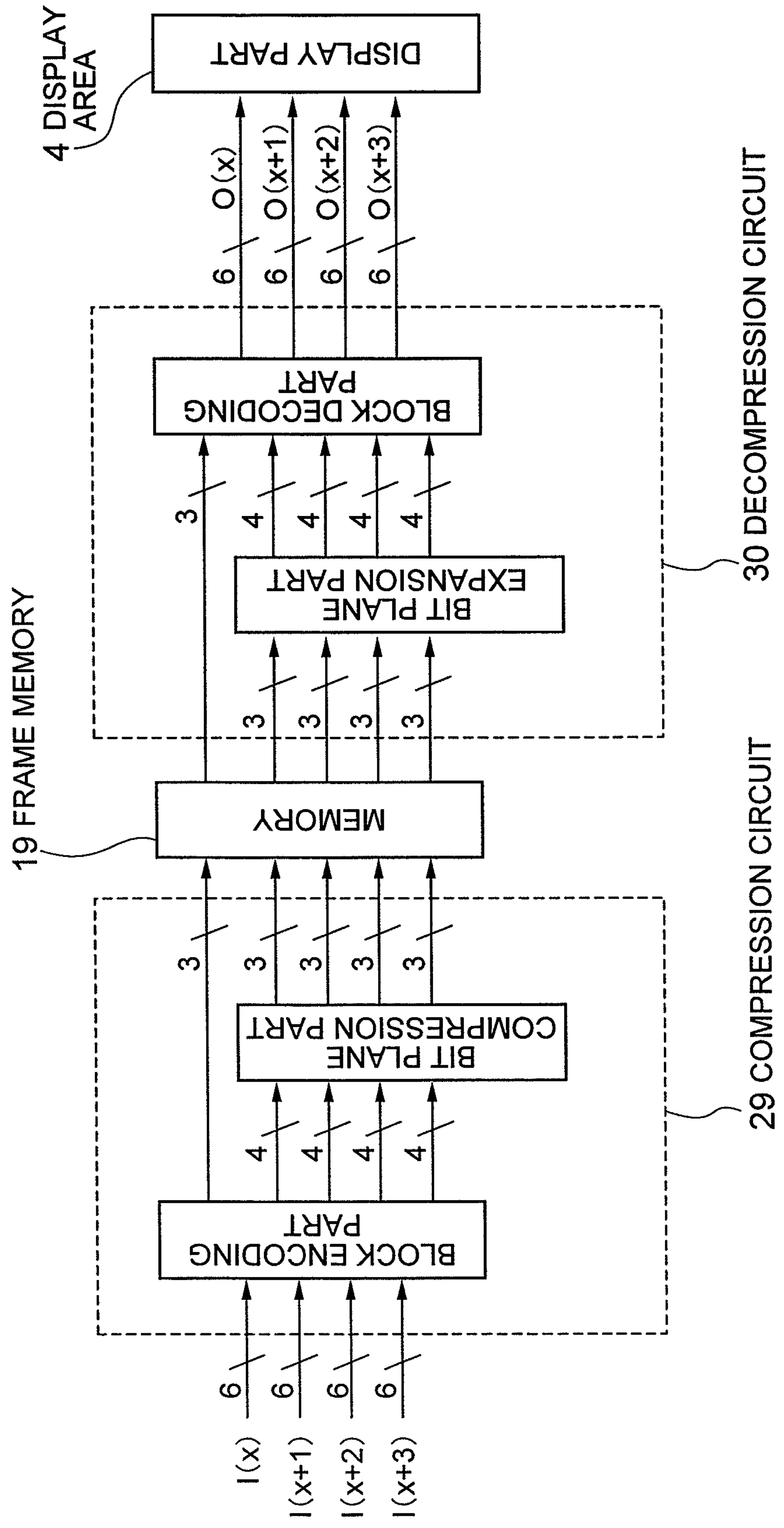
FIG. 29 is an illustration for showing an example of a compression/expansion method that can be used in the present invention.

The compression/expansion method used in the EXAMPLE described above is to perform compression/expansion of the video information for one pixel by using only the data within that one pixel. This method performs compression/expansion for each pixel, so that random access for reading and writing from/to the memory can be performed easily. Further, scale of the compression and expansion circuits is extremely small, and the capacity of the frame memory is decreased for the number of decreased bits. Thus, the area occupied by the compression and expansion circuits and the memory part becomes extremely small. In the meantime, there is also considered a compression/expansion method that utilizes the correlation between the pixels for improving the picture quality when performing compression and expansion. For example, there is a method which performs quantization after performing correlation eliminating processing between the pixels of the data for every 4 pixels. With this method, the data is compressed and expanded by every 4 pixels. With this, the picture quality is improved, and the image data can be transmitted continuously so that the capacity of the transmission line can be reduced. However, it becomes necessary to save and read out new data of several bits that correspond to a flag based on the correlation information of the pixels, by every 4 pixels (it is the new data that is not generated in the quantization performed for each pixel, so that the memory capacity necessary for that is increased slightly). Such compression/expansion method can also be used simultaneously with the data converting circuit and the like described above, so that it is preferably utilized in the present invention. FIG. 29 shows an example of the structure that can achieve such constitution. In this structure, block encoding and its decoding, as well as bit plane compression and its expansion are performed. The original image data of 4 pixels (each data with 6 bits indicated by I(X), I(X+1), I(X+2), I(X+3) in the drawing) are converted into each pixel data with 4 bits and the flags for 3 bits through block encoding. Each of the converted pixel data with 4 bits is changed to each pixel data with 3 bits in the bit plane compression part. Each of the pixel data with 3 bits and the 3 bits of the flags are saved in the frame memory 19. In the decompression circuit 30, each of the pixel data with 3 bits is formed into each image data with 4 bits by the bit plane expansion part, and each pixel data with 4 bits and the 3-bit data of the flags are block-decoded to obtain each pixel data with 6 bits (each data with 6 bits indicated by O(X), O(X+1), O(X+2), O(X+3) in the drawing). The data obtained thereby is displayed on the display area 4.

Although it has not been specifically mentioned above, the lateral pitch of the dots in the display area and the lateral pitch of one unit of the circuit part may or may not be the same. For example, the present invention is effective even when the circuit is arranged by being divided into a plurality of pieces. An example of such structure will be described as a fifth embodiment of the present invention.

Figure 11:
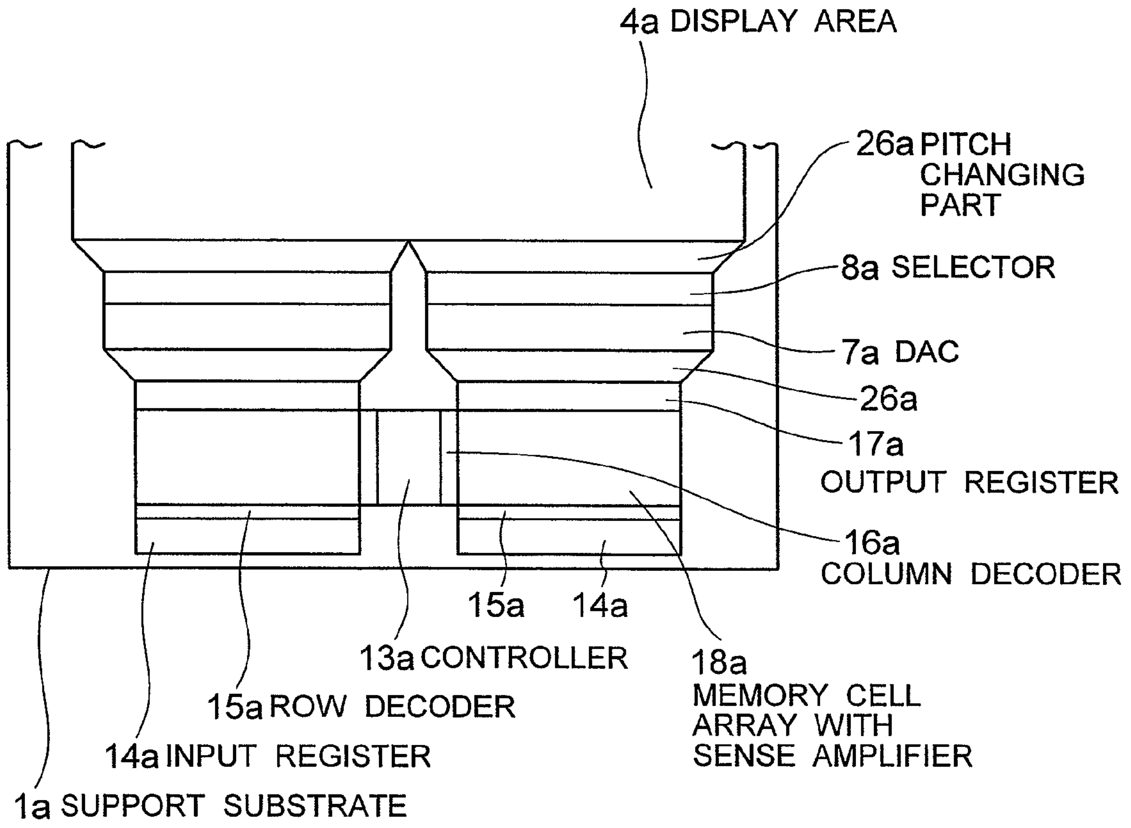
FIG. 11 is a plan view for showing a first example of the layout of a circuit on the signal line side according to a fifth embodiment of the display apparatus of the present invention.

FIG. 11 is a plan view for showing a first example of the layout of the circuit on the signal line side according to the fifth embodiment of the present invention. In the first example of the fifth embodiment, the frame memory part is divided into two. As a result, shown is a structure where two column decoders 16*a* are arranged at a center area, when the frame memory is divided into two on the right and left sides on a support substrate 1*a*. The column decoders 16*a* may not be arranged at the center but may be fixedly arranged at the right or left side of each memory cell array 18*a*. Alternatively, the both may be arranged on the frame side. In FIG. 11, an input register 14*a*, a row decoder 15*a*, an output register 17*a*, a DAC 7*a*, and a selector 8*a* are also divided into two on the right and left sides. In this structure, the pitch of the frame memory and that of the DAC part are different from each other. In addition, the pitch of the DAC part and that of the display area are different from each other. Thus, a pitch changing part 26*a* for changing the pitches is formed between each circuit block. It is evident that this embodiment can achieve the effect of the present invention, such as reducing the circuit scale, decreasing the frame, etc.

Figure 12:
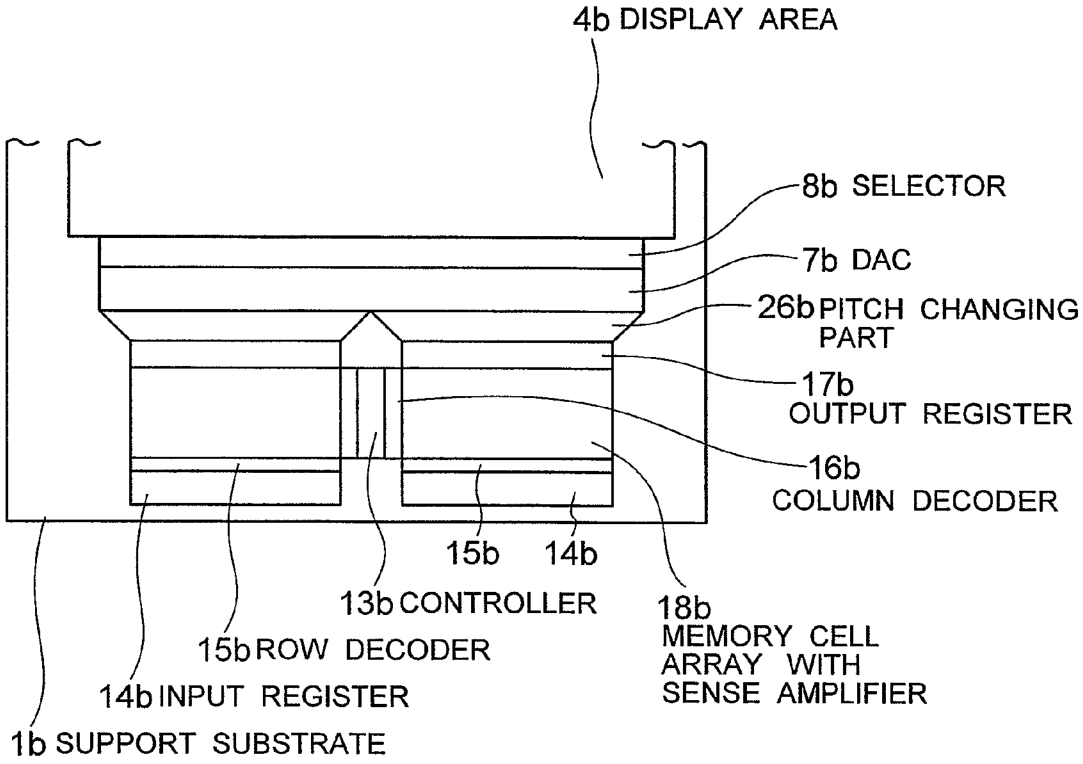
FIG. 12 is a plan view for showing a second example of the layout of a circuit on the signal line side according to the fifth embodiment of the display apparatus of the present invention.

FIG. 12 shows a second example that employs a different layout from that of FIG. 11. In this drawing, a DAC 7*b* and a selector 8*b* are not divided into two. As a result, the pitch changing part between the selector 8*b* and the display area 4*b* becomes unnecessary. In this structure, it is not essential for the pitch of the DAC part and that of the display area to be the same. Even if the pitch of the DAC part and that of the display area are different, it is possible to be dealt with by employing the structure in which the pitches are changed naturally within the circuit layout of the DAC 7*b* and the selector 8*b*.

Figure 13:
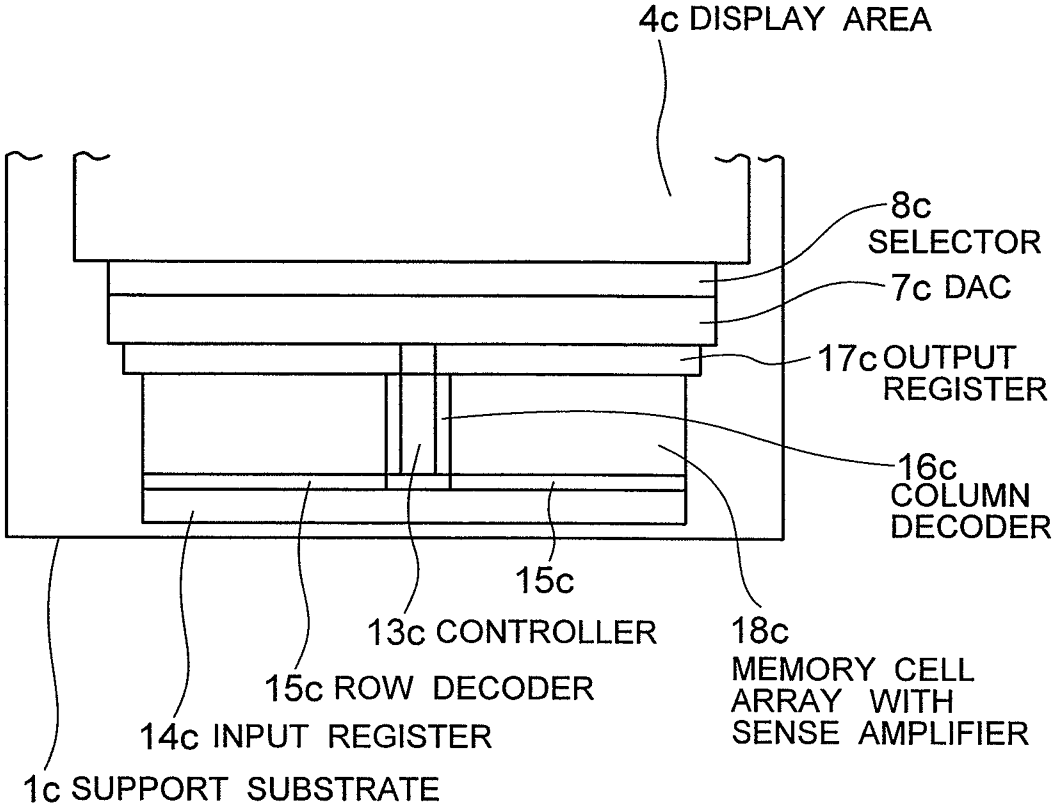
FIG. 13 is a plan view for showing a third example of the layout of a circuit on the signal line side according to the fifth embodiment of the display apparatus of the present invention.

Further, FIG. 13 shows a third example that employs a different layout from those of FIG. 11 and FIG. 12. In this structure, the DAC part and an input register 14*c* are not divided into two but the frame memory part alone is divided. Furthermore, there is no pitch changing part formed therein. In this structure, the pitch changing part is omitted by employing the structure in which the pitches are naturally changed within each circuit, for the circuit blocks that have different pitches. When there is no pitch changing part as in this case, the frame can be more decreased compared to the cases of FIG. 11 and FIG. 12.

In another embodiment of the present invention, all the circuits that are necessary for connecting to a CPU bus are built-in on the support substrate. Those circuits include all the timing controller, the serial interface circuit, the power supply circuit, the capacitance and resistance for the power supply circuit, the clock generating circuit, and the like. As the serial interface, various kinds can be used depending upon the specification regarding the CPU bus. For example, SPI (serial peripheral interface), I2C (inter integrated circuit), UART (universal asynchronous receiver/transmitter), and the like can be used.

In a normal structure, a master function is not required for the serial interface and only a slave function is required. In the meantime, the clock generating circuit can employ some different structures depending upon the specification. When all the clocks are synchronized with the clock received from the serial interface, there is a function provided to divide/multiply or phase-shift the clocks obtained from the serial interface. In this case, when the serial interface communicates with both the clock and the data, the clock obtained through the communication can be used as it is.

In the meantime, in the case of the structure where the serial interface communicates only with the data, a clock recovery circuit for regenerating the clock from the data is provided to utilize the regenerated clock. Further, when the clock of the serial interface and the clock used for display or the like are not synchronized, it is necessary to have an additional clock generating circuit built therein. Such structure is used when, for example, the process up to writing the data to the frame memory is carried out with the clock that is synchronized with the clock from the serial interface and the process between the readout of the data from the frame memory until its display is carried out with the clock that is not synchronized with the clock from the serial interface.

Furthermore, there is a built-in inspection circuit provided therein as necessary. For example, the inspection circuit may be placed on the larger-scale circuit side, when one word line of the frame memory 19 is to be inspected at once by the memory inspection circuit or when one scanning line of the display area is 4 to be inspected by a display area inspecting circuit. Similarly, it is also possible to perform inspection of one data line of the frame memory 19 and one signal line of the display area 4. For arranging the inspection circuit, there may be cases where it is placed on the side where other large-scaled circuit is placed, or cases where it is placed on the side where a small-scaled circuit is placed to balance the scales of the circuits.

Figure 30:
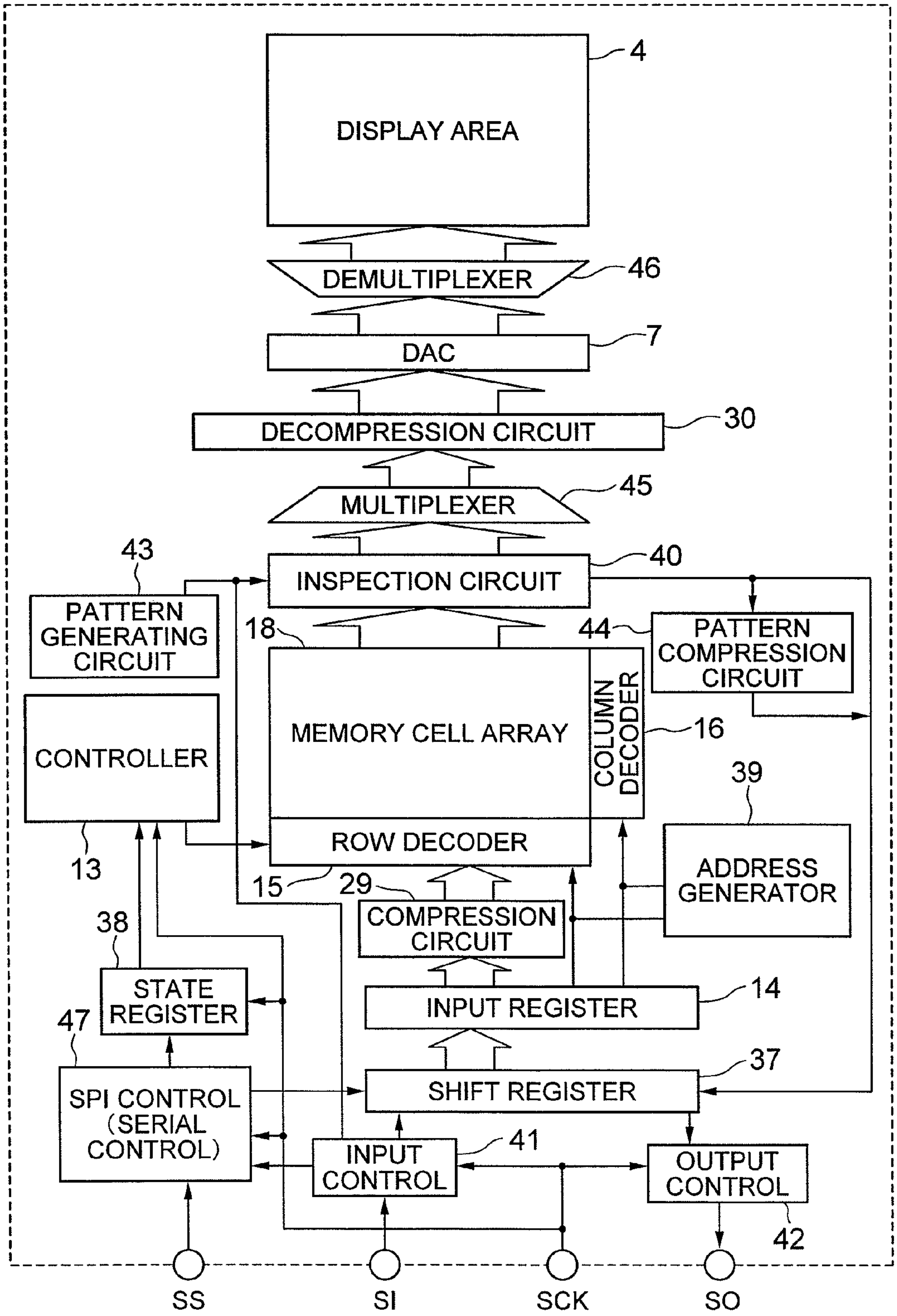
FIG. 30 is a block diagram of the case where a built-in inspection circuit is provided in the EXAMPLE of the present invention.

FIG. 30 shows an example of the structure where a built-in inspection circuit is provided. This structure also has the above-described serial interface provided therein. With the inspection circuit, it is possible to perform inspection on the inspection data itself inputted in a serial manner or through making a comparison with the inspection pattern that is generated by a built-in pattern generating circuit 43. For inspecting the output of the memory, the output from an inspection circuit 40 is outputted as it is from an output control 42, or outputted after being patterned by a pattern compression circuit 44. The inspection of the memory can be achieved in these ways. As illustrated in the drawing, it can be seen that the scale of the circuits other than the display area 4 is extremely large, so that it is understood that the present invention can be preferably applied.

In the above, there has been described by referring to the case where the drive circuit for driving the display area 4 is arranged only on one side of the display area, e.g. only on the left side of the right-and-left direction or only on the bottom side of the top-and-bottom direction. However, the drive circuit can be arranged on all the sides by surrounding the display area 4, when necessary. For example, it is possible to arrange the scanning line drive circuits on both of the right and left sides of the display area 4. In that case, the scanning lines within the display area 4 may be connected in the right-and-left direction to connect the drive circuits on the right and left sides. Alternatively, the scanning lines may be separated within the display area 4 so that the right or the left side can be operated separately. Furthermore, the drive circuit may be provided to be capable performing bidirectional scanning, e.g. capable of starting the scanning from the right side or the left side at will. By the use of bidirectional scanning, it is possible to change the upper part and bottom part of the picture displayed in the display apparatus.

Further, the present invention can also be used preferably, when increasing the display frequency of the video (for example, increasing it to 90 Hz or 120 Hz) in order to improve the performance for displaying motion pictures, or when dealing with the tailing of a hold-type display by adding black display after writing the video. In such cases, the effects such as narrowing the frame, etc. can be obtained by applying the present invention, whether the data conversion is performed on the display apparatus or the outside.

Furthermore, the present invention can also be used preferably for a display apparatus that is capable of dealing with three-dimensional images, which can display a three-dimensional image or switch a three-dimensional image and a normal image for display. In particular, the present invention is very effective to reduce the circuit scale when the data conversion required for displaying the three-dimensional image or the like is performed on the display apparatus.

As the display substance for the case of using the color filters, various kinds of substances, typically the liquid crystal, may be used. As an example for the electrophoresis type, a microcapsule type electrophoresis substance, which is obtained by encapsulating white and black fine particles such as titanium oxide and carbon black into a microcapsule, can be used. A display method (sometimes referred to as a toner type display) by powders using the same particles or the like can also be used. A fine color display can be achieved by a combination of those materials that basically performs binary display and the color filters. Meanwhile, color display can be achieved by combining white organic EL substance an the color filters. With this structure, a high-speed response can be achieved. In addition, it is easier to form this structure than the structure using organic substances of each color, and a high efficiency can be achieved as well.

For the semiconductor that constitutes the circuit, there are various kinds that can be used. For example, amorphous silicon, high-temperature polysilicon, low-temperature polysilicon, or a single-crystal silicon can be used. The circuit is formed through constituting a transistor, for example, with such materials. Further, an organic transistor made of an organic material can be used as well. Furthermore, it is possible to use a transistor formed by an oxide semiconductor such as a transparent oxide semiconductor, which is a typical amorphous oxide semiconductor.

The organic transistor has such a character that it uses an organic material and various micromachining techniques can be applied thereto. That is, in addition to mask vapor deposition, it is possible to perform molding by printing technique such as transcription, inkjet printing, nano-imprinting technique, and to form patterns by a fusion technique or the like. Widely known for this material is pentacene that is used as a typical p-type semiconductor. Essentially, pentacene is not the substance that works only as the p-type semiconductor. Rather, it is an ambipolar material (exhibits asymmetrical characteristic to an electron and a hole) which can be used as an n-type semiconductor by adjusting the electrode structure and the surrounding atmosphere. This is also the characteristic when using the organic semiconductor. Other than pentacene, various kinds of materials can be used such as polyothiophene, fullerene (C60), C60MC12 (C60-fused pyrrolidine-meta-C12 phenyl) and PCBM (6,6-phenyl-C61-Butyl acid-Methylester) as fullerene derivatives, perfluorinated phthalocyanine, perfluorinated pentacene, etc.

Further, by the use of the liquid-crystal organic semiconductor such as fluororene derivative, the orientation of the molecules can be utilized. With this, an organic transistor with high mobility can be formed by forming a channel in the direction of orientation. Meanwhile, a transparent oxide semiconductor has such a character that it is easy to adjust the carrier density, easy to form a film at a normal temperature, and transparent in a visible light area. Since it can be formed at a normal temperature, it is possible to form a transistor on a soft substrate such as a plastic substrate.

As the transparent oxide semiconductor, ZnO (zinc oxide), Zn—Sn—O (zinc-tin oxide), In—Zn—O (IZO: indium-zinc oxide), In—Ga—Zn—O (a-InGaZnO, a-IGZO: indium-gallium-zinc-oxygen based amorphous semiconductor) such as $InGaO_3$ $(ZnO)_5$, a-$In_2O_3Sn$ (amorphous ITO (indium-tin oxide)) or the like can be used. As the gate insulating film, SIN (silicon nitride), $Y_2O_x$ (yttrium oxide) of high-k material, or the like can be used.

For the electrode, ITO can be used preferably. a-IGZO and ITO can be formed with almost the same process. That is, they can be formed by sputtering or vapor deposition. It is easy to form the pattern by using a metal mask or the like at the time of forming the film. The transistor formed with the transparent oxide semiconductor can achieve a high mobility compared to the case of using the amorphous silicon TFT and the organic TFT, and it is effective when forming a complicated circuit.

Furthermore, it is possible to use one form of carbons such as C60, carbon nanotube, fullerene, or the like for the semiconductor.

The present invention is not limited to the color filters of R. G. B shown in the drawings used for the descriptions provided above. That is, it can be applied to the case of arranging the color filters in the reversed order of B, G, R, or to the case where the filters are arranged starting from a different color, such as in the order of G, B, R. Further, reflection-type color filters may be used for the color filters. In that case, the opening ratio can be increased compared to that of the transmission type.

The present invention is not limited to the color filters with three colors of R, G, B arranged in stripes, which are referred to provide descriptions provided above. It is obvious that the present invention is effective in the case of using the color filters of two or more colors arranged in stripes. That is, it can also be applied to a display apparatus in which the number of colors for the color filters is increased to four, six or the like to expand the color range and achieve purification (often referred to as a multicolor display apparatus). When the number of colors is increased, the present invention can be applied by performing data conversion corresponding to that change. For conversion of the data, the circuit on the display apparatus may be used or the external circuit such as the driver IC may be used. For using the driver IC, it is necessary to develop a new IC for the exclusive driver IC with the increased number of colors. Thus, the driver IC for the three primary colors may be utilized by performing data conversion for converting the signal of four or more primary colors, so that it can be inputted to the driver IC for the three primary colors. The ratio of dots between the longitudinal side and the lateral side is increased in the display apparatus in which the number of the colors for the color filters is increased, so that the effect of the present invention becomes prominent. Further, the present invention can also be applied to a display apparatus (for example, a spectrum sequential display) which employs a combination of time division light-up of light sources of a plurality of colors and color filters of a plurality of colors.

Furthermore, the layout of the color filters according to the present invention is not limited to the stripe form. That is, the effect of the present invention can be achieved by forming the color filter of a certain dot into a laterally long shape. For example, it is possible to obtain the effect in such a form that the color filters are arranged discontinuously on a straight line at a constant pitch. In the structure where the color filters are arranged discontinuously as in this case, by treating a part having a color filter and a part having no color filter as a single dot, it is possible to increase the luminance of display at the part of the single dot where there is no color filter. As a result, the effect of the present invention becomes prominent particularly in a high-luminance type display apparatus or a reflection type or transflective display apparatus that needs to secure the luminance by using reflection. At the same time, high-performance display can be achieved.

Figure 14A:
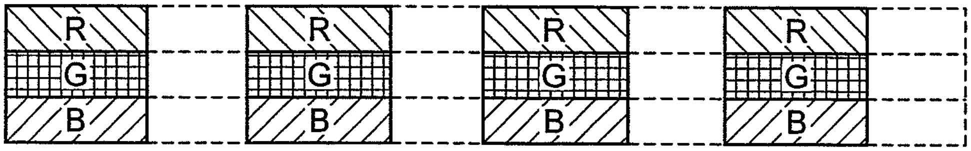
FIGS. 14A, 14B, and 14C are plan views for showing further examples of the structure of a color filter according to the present invention.
Figure 14B:
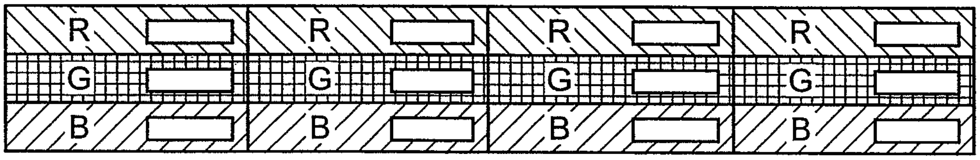
Figure 14C:
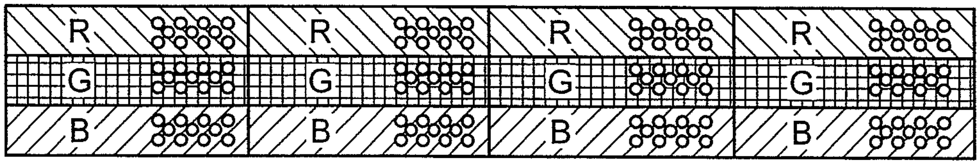

The effect of the present invention can be achieved not only in the discontinuous structure but also in the structure with holes formed therein. FIG. 14 shows examples of such layout of the color filters. FIG. 14A shows the discontinuous structure, FIG. 14B shows the structure with rectangular holes, and FIG. 14C shows the structure with small circular holes opened therein. The present invention is suitable for such various kinds of color filters. Further, referring to FIG. 14A, the color filters themselves may be divided further and may not be in a laterally long shape, as long as the individual dot is in a laterally long shape.

Figure 15A:
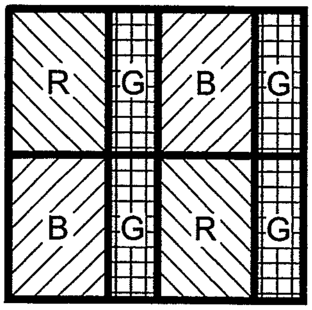
FIG. 15A shows a first example of a conventional Pentile type color filter.
Figure 15B:
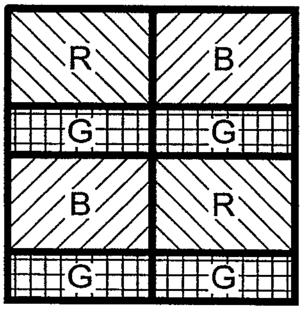
FIG. 15B shows a first example of the color filter according to the present invention.
Figure 15C:
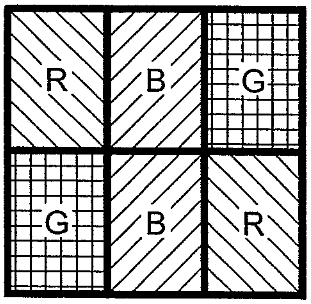
FIG. 15C shows a second example of the conventional Pentile type color filter.
Figure 15D:
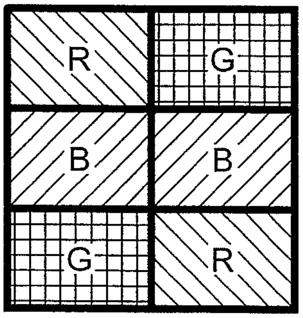
FIG. 15D shows a second example of the color filter according to the present invention.
Figure 16:
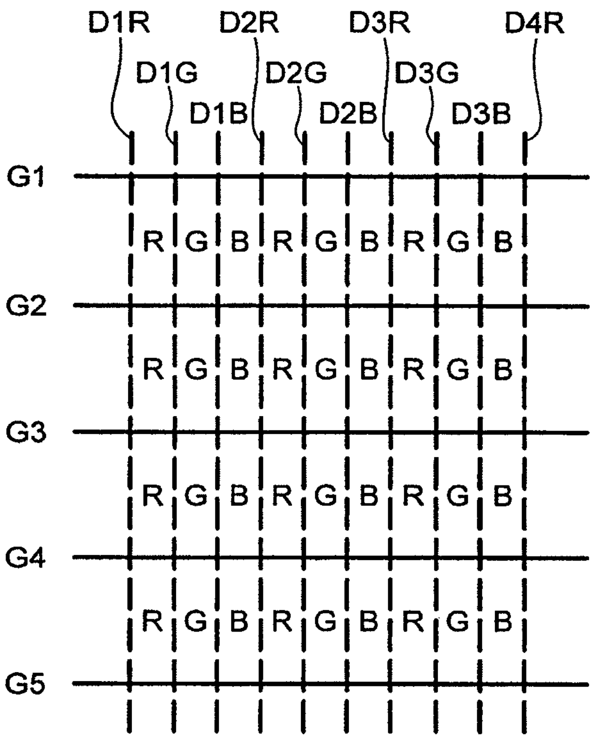
FIG. 16 is a plan view for showing the layout of each dot and the color filters within a display area in a conventional display apparatus.

Furthermore, the present invention can also be applied to Pentile layout that is advocated from ClairVoyante as another type of color filter layout. In this Pentile layout, it is possible to obtain the view of the same resolution as that of the stripe layout by still larger dots through utilizing the characteristic of the eyes. FIG. 15A shows a first example of color filters in the conventional Pentile layout. When the scanning line drive circuit is provided in the right-and-left direction of the display part, the present invention arranges the layout of FIG. 15A into a laterally long layout as in FIG. 15B. It is evident that the effect of the present invention can be obtained by employing such layout. FIG. 15C shows a second example of color filters in another conventional Pentile layout. FIG. 15D shows an example of the laterally long layout according to the present invention, which corresponds to the layout shown in FIG. 15C.

In the above, it has been described on an assumption that there are the scanning line drive circuit and the signal line drive circuit. However, those two circuits are not essential. That is, the effect of the present invention can be achieved by the relation of the circuits built within the lateral direction (on the right and left sides) of the display part, the ratio of the scales of the circuits built within the longitudinal direction (the top and bottom sides) of the display part, and the two-dimensional width of the dots that constitutes the pixels. Thus, the shape of the dot is not limited to be laterally long shape. For example, the present invention can be embodied in a display apparatus with the scanning line drive circuit and another circuit, provided that the length in the two directions in at least one two-dimensional layout of the dots that constitute the pixel is shorter on the scanning line drive circuit side. In other words, when the scanning drive circuit is arranged in the right-and-left direction of the display part, the dots are arranged in such a manner that the length of the dot on the circuit side that is in a larger scale than the scanning line drive circuit becomes longer. That is, the length of the dot in the right-and-left direction is set to be longer than that of the dot in the top-and-bottom direction. Meanwhile, when the scanning line drive circuit is arranged in the top-and-bottom direction of the display part, the length of the dot in the top-and-bottom direction is set to be longer than that of the dot in the right-and-left direction so that the length of the dot on the circuit side that is in a larger scale than the scanning line drive circuit becomes larger.

In the above, the shape of the dot is mainly described as being rectangular. However, it is not essential for the dot to be rectangular, as long as the space can be filled with the dots that correspond to a plurality of colors. That is, the shape may be a hexagon, a trapezoid obtained by further dividing a hexagon into two, or pentagon, for example.

Further, it is evident that each dot is not necessarily in the same shape. It is important in the present invention how the two-dimensional lengths of the dot, which contributes to reduction of the circuit scale, are being set. When the shape of the dot is not a cuboid, the present invention is applied by taking the average length in the respective directions as the two-dimensional lengths. For example, when the scanning line drive circuit is arranged in the top-and-bottom direction of the display part, the average length of the dots in the top-and-bottom direction is set longer than the average length of the dots in the right-and-left direction so that the average length of the dot in the circuit that is in a larger scale than that of the scanning line drive circuit becomes longer.

In the above, the two-dimensional dot layout method itself has been described assuming that the dots are arranged in square. However, it is not limited to be in a square layout. The present invention can also be applied to a rectangular layout in which the pitches of the dots in the right-and-left direction and the top-and-bottom direction are different, and an oblique layout in which, when being translated, the position of the dot changes in the directions other than the translation direction. Furthermore, for example, the space may be filled in an aperiodic manner with the dots of Penrose tile shape or the like. In that case, the length as the pitch cannot be defined. However, as described above, it is possible to achieve the structure of the present invention by defining the two kinds of direction by considering the two-dimensional space and defining the average lengths in those directions. However, it is possible with this structure that the average lengths in the two directions become equal due to the aperiodic characteristic, depending on the method for selecting the two directions and the number of dots contained in the display area.

Furthermore, the present invention can also be applied to a system referred to as an adaptive-type color display. In this system, the video signals are analyzed to investigate the contents thereof and the brightness of the peripheral environment, or the condition set according to the preference of the viewer. In addition, the peculiar characteristic of the display apparatus is also considered to adjust the signals to be displayed on the display area. Further, the luminance of backlight is also adjusted for the display apparatus that uses the backlight. In this system, the display that is actually observed is adjusted in accordance with the viewing condition and the video signals, so that it is possible to perform display by fully utilizing the performance of the display apparatus. The data converting circuit, the luminance sensor, and the like required for this system can be arranged as a part of the structure of the present invention as necessary.

Next, a seventh embodiment of the present invention will be described by referring to FIG. 1A. This embodiment does not use the color filters. This embodiment achieves color display by using light-emitting elements instead. That is, a display area 4 in which pixels are provided in matrix, a scanning line drive circuit 2 for driving scanning lines, and a signal line drive circuit 3 for driving signal lines are provided on a support substrate 1. The pixel within the display area is constituted with a plurality of dots. Each dot corresponds to a light-emitting element of a certain color. The dot is in a laterally long shape, i.e. in a shape extending in a direction along the scanning lines. In other words, each dot is in a shape extending in parallel with the longitudinal direction of the signal line drive circuit 3. The light-emitting elements are of lateral stripe type, for example.

It is evident that the effect of the present invention can be achieved in this embodiment. Further, by replacing the color filters of the second to sixth embodiments described above with the light-emitting elements, the light-emitting elements and other structures of each embodiment can be combined.

Various types can be used as the light-emitting elements. For example, organic EL substances of a plurality of colors can be used. An organic EL substance is a kind of electroluminescence elements, which illuminates by supply of electric field. Since it is a self-luminous substance, there is no absorption of light by the color filters. Further, it can provide a high-speed response. Other electroluminescence elements can be used as well.

Further, it is possible to perform plasma color display by using gas generating plasma and fluorescent elements as the light-emitting elements. Similarly, color display by FED (field emission display) can be achieved by using an electron emitting source and fluorescent elements as the light-emitting elements.

Meanwhile, as the light-emitting element, it is possible to use a stress-induced light-emitting element that illuminates by the stress. The luminance efficiency can be improved by forming those light-emitting elements into a photonic crystal structure. With the photonic crystal structure, light that is normally closed in within the light-emitting element and not emitted to the outside can be taken out to the outside.

Figure 28:
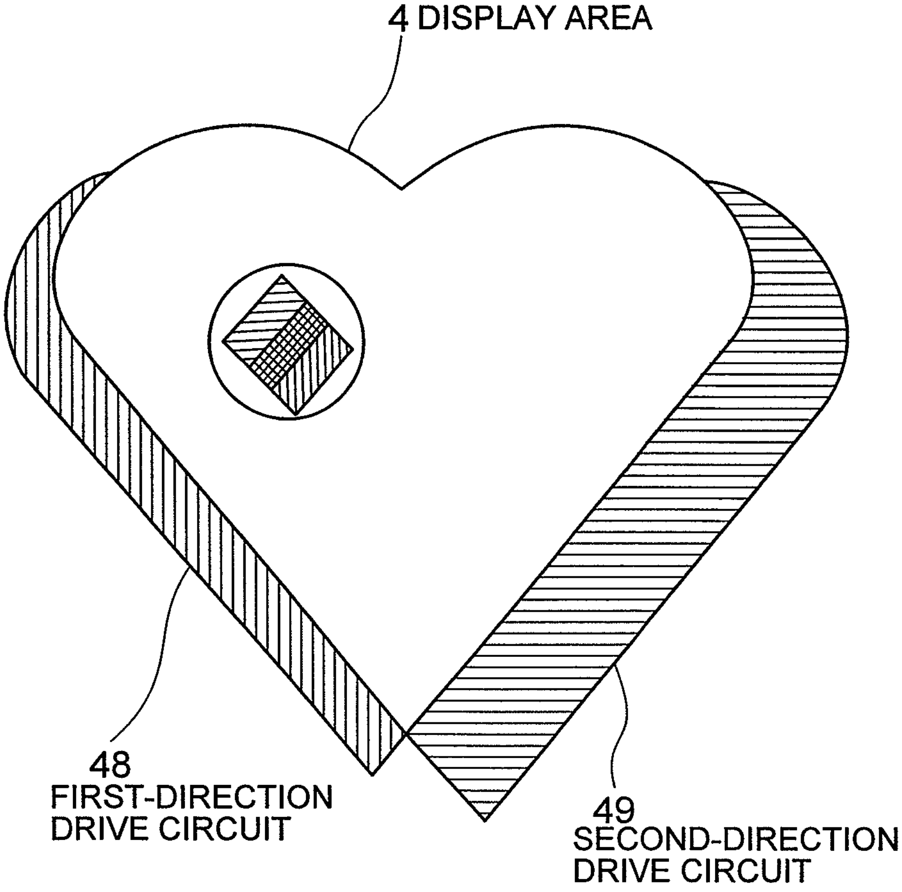
FIG. 28 is an illustration for showing a display apparatus with a non-rectangular display area according to an eighth embodiment of the present invention.

An eighth embodiment of the present invention will be described by referring to FIG. 28. In this embodiment, the display area 4 is in a non-rectangular shape. In FIG. 28, the display area 4 is a heart-shaped type. A drive circuit 48 in the first direction and a drive circuit 49 in the second direction are provided in the periphery of the display area 4. The shape of the pixel in the drawing is not a rectangular but a parallelogram, and each side corresponds to the first-direction drive circuit 48 and the second-direction drive circuit 49. Referring to this drawing, the circuit scale of the second-direction drive circuit is larger. Thus, the pixels are in a lateral stripe type to be in parallel with the lying direction of the second-direction drive circuit. With this structure, the layout size of the second-direction drive circuit 49 can be reduced compared to the case of the longitudinal stripe type. As a result, the external shape of the display apparatus can be formed in a shape similar to that of the display area 4.

Next, a ninth embodiment of the present invention will be described. This embodiment is a near-eye equipment using the display apparatus of the present invention. The near-eye device includes a view finder of a camera, video camera, and the like, head mount display, head-up display, and other devices that are used very close to the eyes (for example, within 5 cm). The display apparatus is used for the near-eye device in this embodiment, so that the device needs to be small-sized and light-weight. Thus, the effect of applying the present invention is significant. In this embodiment, a conventional display apparatus provided to the near-eye device is simply replaced with the display apparatus of the present invention, so that the detailed description of the near-eye device will be omitted. That is, the structure of the near-eye device according to the embodiment is the same as that of the known technique, except for the display apparatus.

Next, a tenth embodiment of the present invention will be described. This embodiment is a portable terminal using the display apparatus according to the present invention. The portable terminal includes a portable telephone, an electronic notebook, PDA (personal digital assistance), a wearable personal computer, and the like. This portable terminal is used for being carried around at all times, so that it needs to be small-sized and light-weight. The effect of applying the present invention is significant for such use as well. In this embodiment, a conventional display apparatus provided to the portable terminal is simply replaced with the display apparatus of the present invention, so that the detailed description of the portable terminal will be omitted. That is, the structure of the portable terminal according to the embodiment is the same as that of the known technique, except for the display apparatus.

What is claimed is:

1. A display apparatus, comprising:

a display part where pixels, each being constituted with a single or a plurality of dots, are arranged in matrix on a support substrate in a first direction and a second direction;

a first circuit provided on outer side of the first direction of the display part on the support substrate; and a second circuit whose scale is larger than that of the first circuit, which is provided on outer side of the second direction of the display part on the support substrate, wherein the dot is in a shape that is longer in the first direction than the second direction, wherein at least one of the plurality of dots has a color filter, wherein the color filter corresponds to one of a plurality of colors by each of the dots, and the second circuit comprises a plurality of circuit elements, the circuit elements are arranged in the first direction at a constant repeated pitch, each circuit element comprises a wiring part defining an area, a circuit part arranged in the area, and a space part between the circuit part and the wiring part; and a following relation is satisfied where, in one of the circuit elements, a proportion of a sum of a width of the wiring part and a width of the space part in the first direction occupying the repeated pitch is c, a ratio of a length in the first direction of the circuit part to a length of the second direction of the circuit part is b, and a number of the plurality of colors of the plurality of dots is k, $b+c>1/k$.

2. The display apparatus as claimed in claim 1, wherein at least one of the plurality of dots comprises a light-emitting element.

3. The display apparatus as claimed in claim 2, wherein the light-emitting element corresponds to one of the plurality of luminance colors by each of the dots.

4. The display apparatus as claimed in claim 3, wherein the light-emitting element corresponds to each dot of the same color in a same column of the first direction.

5. The display apparatus as claimed in claim 2, wherein the light-emitting element is constituted with a fluorescent element, an electroluminescence element, a stress-induced light-emitting element, or a photonic crystal structure.

6. The display apparatus as claimed in claim 1, wherein a frame memory, a timing controller, or a serial interface is provided on the support substrate.

7. The display apparatus as claimed in claim 1, wherein the support substrate is constituted with a glass substrate, a quartz substrate, a plastic substrate, or a silicon substrate.

8. The display apparatus as claimed in claim 1, wherein at least either the first circuit or the second circuit is constituted with amorphous silicon, polysilicon, single-crystal silicon, an organic semiconductor, or an oxide semiconductor.

9. A near-eye device using the display apparatus claimed in claim 1.

10. A portable terminal using the display apparatus claimed in claim 1.

11. The display apparatus as claimed in claim 1, wherein the color filter corresponds to each dot of the same color in a same column of the first direction.

12. The display apparatus as claimed in claim 1, wherein the display part comprises a scanning line, and the first circuit includes a scanning line drive circuit for driving the scanning line.

13. The display apparatus as claimed in claim 1, wherein the display part comprises a signal line, and the second circuit includes a signal line drive circuit for driving the signal line.

14. The display apparatus as claimed in claim 13, wherein the signal line drive circuit is a circuit for performing parallel data processing by expanding a bus width.

15. The display apparatus as claimed in claim 13, wherein the wiring part comprises two first wirings parallel to the first direction and two second wirings parallel to the second direction, and the first and second wirings coordinately define the area to receive the circuit part.

16. The display apparatus as claimed in claim 15, wherein the circuit part is a sense amplifier part.

* * * * *